US012812369B2

(12) United States Patent
Elshafie et al.

(10) Patent No.: US 12,812,369 B2
(45) Date of Patent: Nov. 24, 2026

(54) EAVESDROPPING DETECTION AND METHODS TO MITIGATE EAVESDROPPING

(71) Applicant: QUALCOMM Incorporated, San Diego, CA (US)

(72) Inventors: Ahmed Elshafie, San Diego, CA (US); Danlu Zhang, San Diego, CA (US); Abdelrahman Mohamed Ahmed Mohamed Ibrahim, San Diego, CA (US); Muhammad Sayed Khairy Abdelghaffar, San Jose, CA (US); Alexandros Manolakos, Athens (GR); Hung Dinh Ly, San Diego, CA (US); Yu Zhang, San Diego, CA (US); Juergen Cezanne, Ocean Township, NJ (US)

(73) Assignee: QUALCOMM Incorporated, San Diego, CA (US)

(*) Notice: Subject to any disclaimer, the term of this patent is extended or adjusted under 35 U.S.C. 154(b) by 121 days.

(21) Appl. No.: 18/865,144

(22) PCT Filed: Jul. 3, 2023

(86) PCT No.: PCT/US2023/069570
§ 371 (c)(1),
(2) Date: Nov. 12, 2024

(87) PCT Pub. No.: WO2024/015698
PCT Pub. Date: Jan. 18, 2024

(65) Prior Publication Data

US 2025/0317730 A1 Oct. 9, 2025

(30) Foreign Application Priority Data

Jul. 15, 2022 (GR) ................................ 0220100561

(51) Int. Cl.
*H04W 12/033* (2021.01)
*H04W 12/0431* (2021.01)
(Continued)

(52) U.S. Cl.
CPC ..... *H04W 12/033* (2021.01); *H04W 12/0431* (2021.01); *H04W 12/06* (2013.01); *H04W 12/121* (2021.01)

(58) Field of Classification Search
CPC ........... H04W 12/033; H04W 12/0431; H04W 12/06; H04W 12/121; H04W 12/67;
(Continued)

(56) References Cited

U.S. PATENT DOCUMENTS

2017/0279778 A1* 9/2017 Lee ....................... H04W 12/35
2018/0124865 A1* 5/2018 Lee ..................... H04W 12/037
(Continued)

FOREIGN PATENT DOCUMENTS

| | | | |
|---|---|---|---|
| EP | 4243468 | A1 | 9/2023 |
| WO | WO-2021151214 | A1 | 8/2021 |
| WO | WO-2022127656 | A1 | 6/2022 |

OTHER PUBLICATIONS

3GPP TR 33.809: "3rd Generation Partnership Project, Technical Specification Group Services and System Aspects Study on 5G Security Enhancement against False Base Stations (FBS) (Release 18)", 3GPP Draft, S3-220484, V0.18.0 (Feb. 2022), 3rd Generation Partnership Project, Mobile Competence Centre, 650, Route Des Lucioles, F-06921 Sophia-Antipolis Cedex, France, Mar. 4, 2022 (Mar. 4, 2022), 129 Pages, XP052194913, p. 28-p. 44, p. 68-p. 72, p. 25, paragraph 6.4.2.2 p. 98, paragraph 6.24-p. 99, paragraph 6.24.
(Continued)

*Primary Examiner* — Juan A Torres
(74) *Attorney, Agent, or Firm* — Holland & Hart, LLP

(57) ABSTRACT

Methods, systems, and devices for wireless communications are described. A user equipment (UE) may communicate
(Continued)

with a network entity using a first security key of a first security configuration which encrypts a first message sent to or received from the network entity. The UE may then receive a control message that indicates that a wireless device has been detected attempting to intercept or eavesdrop the first message communicated between the UE and the network entity. The control message may identify the eavesdropping wireless device, and may include a second security key associated with a greater security strength than the first security key. The control message may also instruct the UE to switch from the first security configuration to the second security configuration based on the presence of the eavesdropper. The UE may then communicate a second message with the network entity that is encrypted using the second security configuration.

30 Claims, 20 Drawing Sheets

(51) Int. Cl.
*H04W 12/06* (2021.01)
*H04W 12/121* (2021.01)

(58) Field of Classification Search
CPC ... H04W 12/79; H04W 12/03; H04W 12/122; H04L 63/1425
USPC ........................ 455/410, 403; 379/189; 726/1
See application file for complete search history.

(56) References Cited

U.S. PATENT DOCUMENTS

| | | | | |
|---|---|---|---|---|
| 2019/0082325 | A1* | 3/2019 | Muhanna .............. | H04W 12/04 |
| 2020/0145818 | A1* | 5/2020 | Lee ........................ | H04L 9/0869 |
| 2020/0236554 | A1 | 7/2020 | Lee et al. | |
| 2022/0225099 | A1* | 7/2022 | Kim ....................... | H04W 12/10 |
| 2023/0308482 | A1* | 9/2023 | Warmenhoven .... | H04L 63/0442 |
| 2023/0319557 | A1* | 10/2023 | Liu ................... | H04W 12/0431 455/410 |

OTHER PUBLICATIONS

International Search Report and Written Opinion—PCT/US2023/069570—ISA/EPO—Sep. 27, 2023.

* cited by examiner

EAVESDROPPING DETECTION AND METHODS TO MITIGATE EAVESDROPPING

CROSS REFERENCES

The present application is a 371 national stage filing of International PCT Application No. PCT/US2023/069570 by ELSHAFIE et al. entitled "EAVESDROPPING DETECTION AND METHODS TO MITIGATE EAVESDROPPING," filed Jul. 3, 2023; and claims priority to Greek patent application No. 20220100561 by ELSHAFIE et al., entitled "EAVESDROPPING DETECTION AND METHODS TO MITIGATE EAVESDROPPING," filed Jul. 15, 2022, each of which is assigned to the assignee hereof, and each of which is expressly incorporated by reference in its entirety herein.

FIELD OF TECHNOLOGY

The following relates to wireless communications, including eavesdropping detection and methods to mitigate eavesdropping.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may implement techniques to increase the security of sensitive data transmissions, especially as the number of connected devices in the network increases.

SUMMARY

The described techniques relate to improved methods, systems, devices, and apparatuses that support eavesdropping detection and methods to mitigate eavesdropping. For example, the described techniques provide support for autonomous communications between connected wireless devices. Some such communications, however, may be vulnerable to higher security risks and eavesdropping threats due to the increased connectivity between the wireless devices. Using some security methods, devices in the wireless communications system may communicate with one another using a first security key which encrypts the sensitive data sent between the devices. In some cases, one or both communications devices (e.g., a network device and a receiving device) may identify the presence of a potential eavesdropping device that is attempting to intercept the encrypted messages. Upon detection of the eavesdropping device, a network device may transmit a control message to a receiving device that indicates or otherwise announces the potential eavesdropping device. Based on receiving the control message, the devices may switch from a first security configuration using the first security key to a second security configuration using a second security key that has a higher security strength than the first security key. The devices may then resume ongoing communications that are secured using the second security configuration and the second security key.

A method for wireless communication at a user equipment (UE) is described. The method may include communicating with a network entity using a first security key of a first security configuration for encrypting first messages to communicate between the UE and the network entity, receiving a control message that indicates that a wireless device has been detected attempting to intercept the encrypted first messages communicated between the UE and the network entity, and communicating, with the network entity, second messages encrypted using a second security key of a second security configuration based on switching from the first security configuration to the second security configuration responsive to receiving the control message indicating that the wireless device has been detected, the second security key associated with a greater security strength than the first security key.

An apparatus for wireless communication at a UE is described. The apparatus may include a processor, memory coupled with the processor, and instructions stored in the memory. The instructions may be executable by the processor to cause the apparatus to communicate with a network entity using a first security key of a first security configuration for encrypting first messages to communicate between the UE and the network entity, receive a control message that indicates that a wireless device has been detected attempting to intercept the encrypted first messages communicated between the UE and the network entity, and communicate, with the network entity, second messages encrypted using a second security key of a second security configuration based on switching from the first security configuration to the second security configuration responsive to receiving the control message indicating that the wireless device has been detected, the second security key associated with a greater security strength than the first security key.

Another apparatus for wireless communication at a UE is described. The apparatus may include means for communicating with a network entity using a first security key of a first security configuration for encrypting first messages to communicate between the UE and the network entity, means for receiving a control message that indicates that a wireless device has been detected attempting to intercept the encrypted first messages communicated between the UE and the network entity, and means for communicating, with the network entity, second messages encrypted using a second security key of a second security configuration based on switching from the first security configuration to the second security configuration responsive to receiving the control message indicating that the wireless device has been detected, the second security key associated with a greater security strength than the first security key.

A non-transitory computer-readable medium storing code for wireless communication at a UE is described. The code may include instructions executable by a processor to communicate with a network entity using a first security key of a first security configuration for encrypting first messages to communicate between the UE and the network entity, receive a control message that indicates that a wireless device has been detected attempting to intercept the encrypted first messages communicated between the UE and the network entity, and communicate, with the network entity, second messages encrypted using a second security key of a second security configuration based on switching from the first security configuration to the second security configuration responsive to receiving the control message indicating that the wireless device has been detected, the second security key associated with a greater security strength than the first security key.

Some examples of the method, apparatuses, and non-transitory computer-readable medium described herein may further include operations, features, means, or instructions for selecting the second security key from a set of multiple security keys according to the second security configuration, different security keys of the set of multiple security keys corresponding to different security strengths, different security types, or both.

In some examples of the method, apparatuses, and non-transitory computer-readable medium described herein, receiving the control message may include operations, features, means, or instructions for receiving the control message indicating for the UE to cancel the use of the first security key of the first security configuration.

In some examples of the method, apparatuses, and non-transitory computer-readable medium described herein, switching, based on the received control message, from communicating the encrypted first messages using a first set of resources associated with the first security configuration to communicating the encrypted second messages using a second set of resources associated with the second security configuration, where the second set of resources may have a greater security strength than the first set of resources.

In some examples of the method, apparatuses, and non-transitory computer-readable medium described herein, the first set of resources include one or more of a first set of frequency resources, time resources, beams, antenna ports, transmission modes, or any combination thereof and the second set of resources include a corresponding one or more of a second set of frequency resources, time resources, beams, antenna ports, transmission modes, or any combination thereof, different from the first set of resources.

In some examples of the method, apparatuses, and non-transitory computer-readable medium described herein, the control message indicates the second security configuration that may be associated with increased physical layer (PHY) security, medium access control (MAC) layer security, user plane security, control plane security, or any combination thereof.

In some examples of the method, apparatuses, and non-transitory computer-readable medium described herein, switching, based on the received control message, from communicating the first messages encrypted using a first authentication signature associated with the first security configuration to communicating the second messages encrypted using a second authentication signature associated with the second security configuration, where the second authentication signature may be associated with a hashing function indicated by the received control message, and may be associated with a greater security strength than the first authentication signature.

Some examples of the method, apparatuses, and non-transitory computer-readable medium described herein may further include operations, features, means, or instructions for communicating, based on the received control message, the encrypted second messages using the second security configuration, where the second security configuration indicates an addition of a noise signal to the encrypted second messages.

In some examples of the method, apparatuses, and non-transitory computer-readable medium described herein, switching, based on the received control message, from communicating the encrypted first messages with the network entity in accordance with the first security configuration to communicating the encrypted second messages with a different network entity in accordance with the second security configuration.

In some examples of the method, apparatuses, and non-transitory computer-readable medium described herein, switching, based on the received control message, from communicating the encrypted first messages on a first band in accordance with the first security configuration to communicating a first subset of the encrypted second messages in a second band and a second subset of the encrypted second messages in a third band in accordance with the second security configuration, where the second band and the third band may be different from the first band and may be associated with a higher security strength than the first band.

Some examples of the method, apparatuses, and non-transitory computer-readable medium described herein may further include operations, features, means, or instructions for refraining from communicating at least a portion of the encrypted first messages based on the received control message.

Some examples of the method, apparatuses, and non-transitory computer-readable medium described herein may further include operations, features, means, or instructions for identifying a change in one or more polarization modes associated with communications of the encrypted first messages, the change indicative of the wireless device attempting to intercept the encrypted first messages and communicating the encrypted second messages using the second security configuration based on the change in the one or more polarization modes.

In some examples of the method, apparatuses, and non-transitory computer-readable medium described herein, the control message includes a downlink control information message encoded with a radio network temporary identifier, transmitted on a control resource set, or both, indicative of the wireless device attempting to intercept the encrypted first messages.

A method for wireless communication at a network entity is described. The method may include communicating with a UE using a first security key of a first security configuration for encrypting first messages to communicate between the network entity and the UE, transmitting, to the UE, a control message that indicates that a wireless device has been detected attempting to intercept the encrypted first messages communicated between the network entity and the UE, and communicating, with the UE, second messages encrypted using a second security key of a second security configuration based on switching from the first security configuration to the second security configuration responsive to transmitting the control message indicating that the wireless device has been detected, the second security key associated with a greater security strength than the first security key.

An apparatus for wireless communication at a network entity is described. The apparatus may include a processor, memory coupled with the processor, and instructions stored in the memory. The instructions may be executable by the processor to cause the apparatus to communicate with a UE using a first security key of a first security configuration for encrypting first messages to communicate between the network entity and the UE, transmit, to the UE, a control message that indicates that a wireless device has been detected attempting to intercept the encrypted first messages communicated between the network entity and the UE, and communicate, with the UE, second messages encrypted using a second security key of a second security configuration based on switching from the first security configuration to the second security configuration responsive to transmitting the control message indicating that the wireless device has been detected, the second security key associated with a greater security strength than the first security key.

Another apparatus for wireless communication at a network entity is described. The apparatus may include means for communicating with a UE using a first security key of a first security configuration for encrypting first messages to communicate between the network entity and the UE, means for transmitting, to the UE, a control message that indicates that a wireless device has been detected attempting to intercept the encrypted first messages communicated between the network entity and the UE, and means for communicating, with the UE, second messages encrypted using a second security key of a second security configuration based on switching from the first security configuration to the second security configuration responsive to transmitting the control message indicating that the wireless device has been detected, the second security key associated with a greater security strength than the first security key.

A non-transitory computer-readable medium storing code for wireless communication at a network entity is described. The code may include instructions executable by a processor to communicate with a UE using a first security key of a first security configuration for encrypting first messages to communicate between the network entity and the UE, transmit, to the UE, a control message that indicates that a wireless device has been detected attempting to intercept the encrypted first messages communicated between the network entity and the UE, and communicate, with the UE, second messages encrypted using a second security key of a second security configuration based on switching from the first security configuration to the second security configuration responsive to transmitting the control message indicating that the wireless device has been detected, the second security key associated with a greater security strength than the first security key.

Some examples of the method, apparatuses, and non-transitory computer-readable medium described herein may further include operations, features, means, or instructions for selecting the second security key from a set of multiple security keys according to the second security configuration, different security keys of the set of multiple security keys corresponding to different security strengths, different security types, or both.

In some examples of the method, apparatuses, and non-transitory computer-readable medium described herein, transmitting the control message may include operations, features, means, or instructions for transmitting the control message that cancels the use of a first security key of the first security configuration.

In some examples of the method, apparatuses, and non-transitory computer-readable medium described herein, switching, based on the transmitted control message, from communicating the encrypted first messages using a first set of resources associated with the first security configuration to communicating the encrypted second messages using a second set of resources associated with the second security configuration, where the second set of resources may have a greater security strength than the first set of resources.

In some examples of the method, apparatuses, and non-transitory computer-readable medium described herein, the first set of resources include one or more of a first set of frequency resources, time resources, beams, antenna ports, transmission modes, or any combination thereof and the second set of resources include a corresponding one or more of a second set of frequency resources, time resources, beams, antenna ports, transmission modes, or any combination thereof, different from the first set of resources.

Some examples of the method, apparatuses, and non-transitory computer-readable medium described herein may further include operations, features, means, or instructions for communicating the encrypted first messages using a first set of channels, securing the first set of channels based on the wireless device having been detected attempting to intercept the encrypted first messages, and communicating the encrypted second messages using the secured first set of channels.

In some examples of the method, apparatuses, and non-transitory computer-readable medium described herein, the control message indicates the second security configuration that may be associated with increased PHY security, MAC layer security, user plane security, control plane security, or any combination thereof.

In some examples of the method, apparatuses, and non-transitory computer-readable medium described herein, switching, based on the transmitted control message, from communicating the first messages encrypted using a first authentication signature associated with the first security configuration to communicating second messages encrypted using a second authentication signature associated with the second security configuration, where the second authentication signature may be associated with a hashing function indicated by the transmitted control message and may be associated with a greater security strength than the first authentication signature.

Some examples of the method, apparatuses, and non-transitory computer-readable medium described herein may further include operations, features, means, or instructions for communicating, based on the transmitted control message, the encrypted second messages using the second security configuration, where the second security configuration indicates an addition of a noise signal to the encrypted second messages.

In some examples of the method, apparatuses, and non-transitory computer-readable medium described herein, switching, based on the transmitted control message, from communicating the encrypted first messages on a first band in accordance with the first security configuration to communicating a first subset of the encrypted second messages in a second band and a second subset of the encrypted second messages in a third band in accordance with the second security configuration, where the second band and the third band may be different from the first band and may be associated with a higher security strength than the first band.

Some examples of the method, apparatuses, and non-transitory computer-readable medium described herein may further include operations, features, means, or instructions for refraining from communicating at least a portion of the encrypted first messages based on the transmitted control message.

Some examples of the method, apparatuses, and non-transitory computer-readable medium described herein may further include operations, features, means, or instructions for identifying a change in one or more polarization modes associated with communications of the encrypted first messages, the change indicative of the wireless device attempting to intercept the encrypted first messages and communicating the encrypted second messages using the second security configuration based on the change in the one or more polarization modes.

In some examples of the method, apparatuses, and non-transitory computer-readable medium described herein, the control message includes a downlink control information message encoded with a radio network temporary identifier, transmitted on a control resource set, or both, indicative of the wireless device attempting to intercept the encrypted first messages.

DETAILED DESCRIPTION

Figure 1:
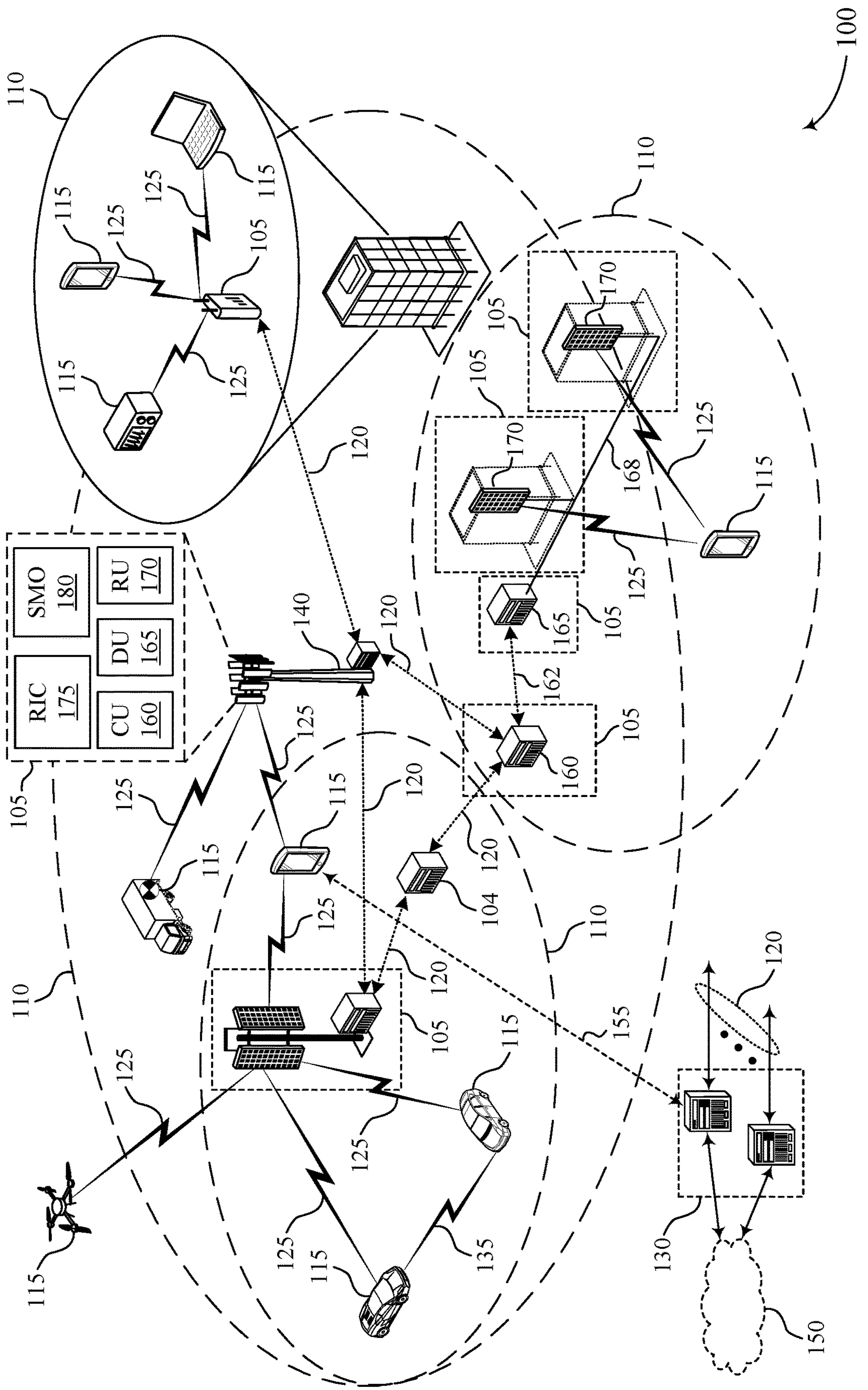
FIGS. 1-4 illustrate examples of wireless communications systems that support eavesdropping detection and methods to mitigate eavesdropping in accordance with one or more aspects of the present disclosure.

Some wireless communications systems may support communications (e.g., internet of things (IoT) communications) where a relatively large number of wireless devices are connected to one another and may autonomously exchange data between one another. Such wireless systems, however, may be vulnerable to greater security risks due to the increased connectivity between the wireless devices. For example, sensitive data sent between devices in the system may be vulnerable to eavesdropping attacks, where an eavesdropping device intercepts or otherwise compromises the sensitive data. Using some security methods, devices in the wireless system may identify the presence of an eavesdropping device, for example, by using techniques for identifying radio frequency (RF) leakage and local oscillation frequency detection which are emitted from the eavesdropping device using a wireless channel. Upon detection of the eavesdropping device, wireless devices may implement a number of different eavesdropping mitigation techniques to add additional security for ongoing communications.

In some implementations, a transmitting device such as a network entity may announce the presence of the eavesdropping device to affected user equipment (UE) using an eavesdropping announcement message that is sent to the UEs. In some examples, the eavesdropping announcement message may be a downlink control information (DCI) message or other control message which includes a radio network temporary identifier (RNTI) (e.g., eavesdropper_detected_RNTI) which indicates the detected eavesdropping.

Once the eavesdropping device is detected, the network entity may define a procedure to mitigate the eavesdropping and to reduce its effect on future communications. In some cases, the network entity may direct the UE to use a stronger security key or a different authentication signature (such as artificial noise) to increase the security for the ongoing communications. In some other examples, the network entity may direct the UE to use a more secure band, bandwidth, set of resources, or set of channels part based on the presence and location of the eavesdropper. In some other cases, the network entity may restrict a set of beams around the detected eavesdropping device and may use a different set of beams to send information, for example, to more narrowly focus the beam on the intended-recipient UE. In some other cases, the UE may send the communications using different antenna ports or orbital angular momentum (OAM) multiplexing modes. In some other examples, the network entity may issue a security key cancellation message or a more general cancellation message for the UE to either switch security keys or entirely cancel communications based on the presence of the eavesdropper. In some other cases, the network may add multi-layer security or may secure unsecured channels that are close to the eavesdropper.

Aspects of the disclosure are initially described in the context of wireless communications systems. Aspects of the disclosure are further illustrated by and described with reference to apparatus diagrams, system diagrams, a process flow and flowcharts that relate to eavesdropping detection and methods to mitigate eavesdropping.

FIG. 1 illustrates an example of a wireless communications system 100 that supports eavesdropping detection and methods to mitigate eavesdropping in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support eavesdropping detection and methods to mitigate eavesdropping as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the “device” may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC)

device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer (PHY) structure for supporting the communication links 125. For example, a carrier used for a communication link 125 may include a portion of an RF spectrum band (e.g., a bandwidth part (BWP)) that is operated according to one or more PHY channels for a given radio access technology (e.g., LTE, LTE-A, LTE-A Pro, NR). Each PHY channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers (CCs) and one or more uplink CCs according to a carrier aggregation configuration. Carrier aggregation may be used with both frequency division duplexing (FDD) and time division duplexing (TDD) CCs. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with CCs operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Wireless communications system 100 may support various methods for eavesdropping detection that may be performed by UE or network entities as described herein. For example, devices may use methods such as RF leakage detection in a MIMO channel. A MIMO channel (e.g., a MIMO wiretap channel) may in some cases be vulnerable to passive eavesdropper devices that may attempt to intercept communications between an authorized transmitter-receiver pair (e.g., a UE 115 and a network entity 105), each equipped with multiple antennas. In wireless communications network 100, the presence of an eavesdropper may be determined before a transmitting device can deploy robust secrecy encoding schemes as a countermeasure. To detect the passive eavesdropper, devices may identify local oscillator power that is leaked from the RF front end of the passive eavesdropper. In some cases, wireless devices may identify leakage via non-coherent energy detection and coherent detection, followed by composite generalized likelihood ratio test (GLRT) detection methods that account for unknown parameters.

In some other examples, an eavesdropping device may implement "phantom eavesdropping" techniques, which may reduce the likelihood of being detected by a device using RF leakage-based detection. For example, a phantom eavesdropper may implement a dynamic alteration process regarding the local oscillator's oscillation frequency, which may reduce RF leakage from the local oscillator in the frequency domain to allow the eavesdropper to become footprint-less. In such cases in which eavesdroppers are difficult to detect (e.g., eavesdroppers having passive receivers that only listen and never transmit any signals), wireless devices may implement techniques to more precisely listen for RF leakage from passive receivers on the wireless medium. This RF leakage, however, is extremely weak and buried under noise and other transmitted signals that can be several orders of magnitude larger. Therefore, in some cases, enhancements to transmitters and receivers such as sensor enhancement (or enhancements to techniques for transmitting and receiving) may be used by wireless devices to detect RF leakage and the associated presence of the eavesdropper.

In some aspects, wireless communications system 100 may support autonomous communications (such as IoT communications) between devices such as UE 115 and network entities 105. Some such communications, however, may be vulnerable to higher security risks and eavesdropping due to increased connectivity between the wireless devices. Using some security methods, devices in the wireless system 100 may identify the presence of a potential eavesdropping device by observing RF leakage and local oscillation frequencies that are emitted from the eavesdropping device using a wireless channel. Upon detection of the eavesdropping device, wireless devices may implement a number of different eavesdropping mitigation techniques to add additional security for ongoing communications.

In some implementations, a transmitting device such as a network entity 105 may announce the presence of the eavesdropping device to affected UE 115 using an eavesdropping announcement message that is sent to the UEs 115. In some examples, the eavesdropping announcement message may be a DCI message or other control message which indicates the detected eavesdropping.

The network entity 105 may then define a procedure to mitigate the eavesdropping and to reduce its effect on future communications. In some cases, the network entity 105 may direct the UE 115 to use a stronger security key or a different authentication signature for the ongoing communications. In some other examples, the network entity may direct the UE 115 to use a more secure band, bandwidth part, set of resources, or set of channels part based on the presence and location of the eavesdropper. In some other cases, the network entity may restrict a set of beams around the detected eavesdropping device and may use a different set of beams to send information. In some other cases, the UE 115 may send the communications using different antenna ports or OAM multiplexing modes. In some other examples, the network entity 105 may issue a cancellation message for the UE 115 to either switch security keys or entirely cancel communications based on the presence of the eavesdropper. In some other cases, the network entity 105 may add multi-layer security or may secure unsecured channels that are close to the eavesdropper.

Figure 2:
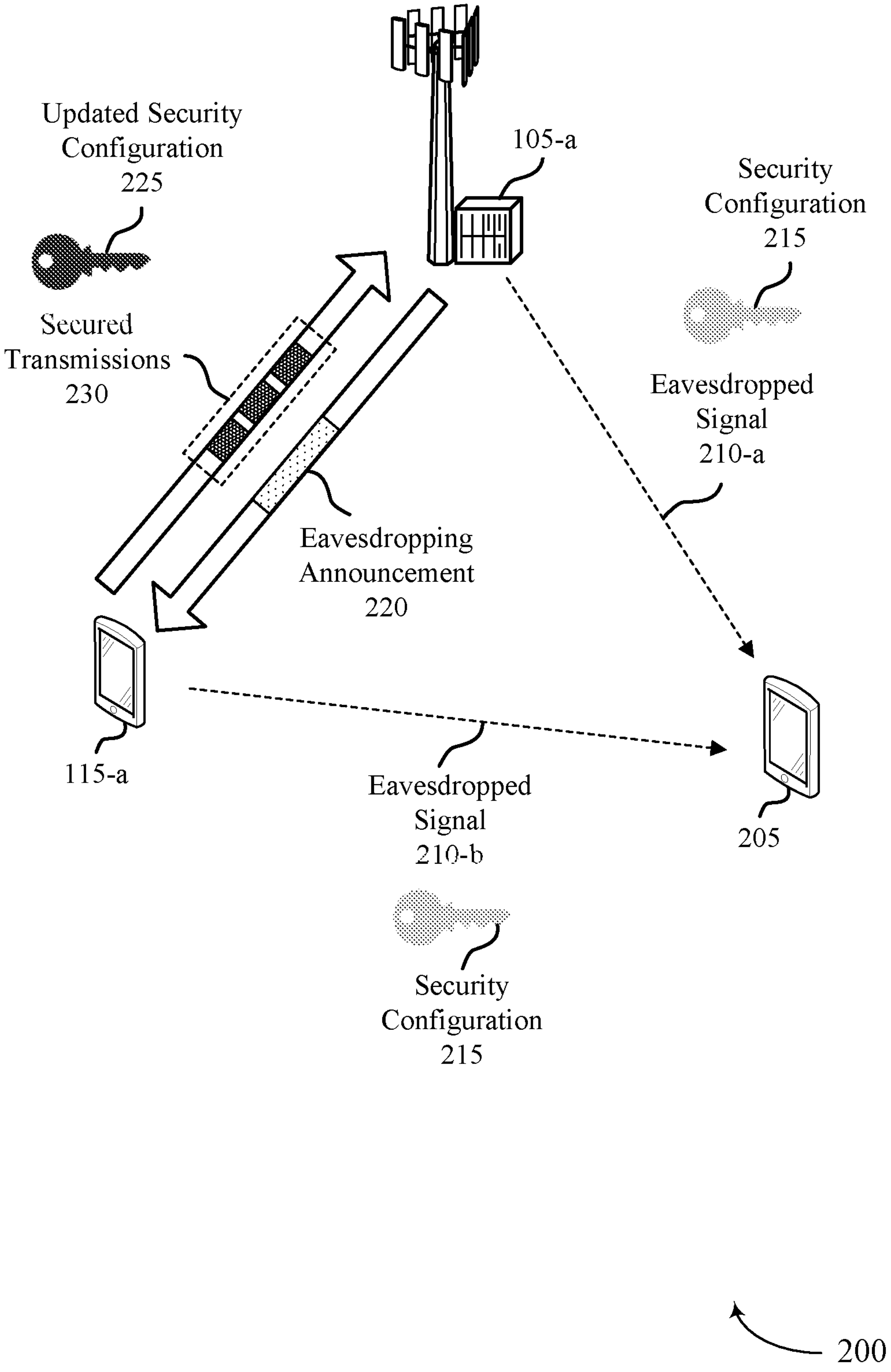

FIG. 2 illustrates an example of a wireless communications system 200 that supports eavesdropping detection and methods to mitigate eavesdropping in accordance with one or more aspects of the present disclosure. For example, wireless communications system 200 may support communications between a UE 115-*a* and a network entity 105-*a*, each of which may be examples of UE 115 and network entities 105 described with reference to FIG. 1. In addition, wireless communications system 200 may include one or more eavesdropping devices 205, which may be UE or network devices as described herein.

Some wireless communications systems may support communications (e.g., IoT communications), where a relatively large number of wireless devices (e.g., network entities such as gNBs, sidelink UEs, sidelink programmable logic controllers (PLCs), receiving UEs) are connected to one another. Such wireless systems, however, may be vulnerable to greater security risks due to the increased connectivity between the wireless devices. For example, wireless communications between devices may be vulnerable to eavesdropping attacks, where sensitive data is intercepted or otherwise compromised by an eavesdropping device. Using some security methods, devices in the wireless system such as a network entity 105-*a* and a UE 115-*a* can identify the presence of an eavesdropping device 205 using RF leakage and the detection local oscillation frequencies emitted from the eavesdropping device 205, among other detection methods. Upon detection of the eavesdropping device, the network entity 105-*a* and the UE 115-*a* may implement a number of different techniques to add additional security (e.g., PHY layer security) for ongoing communications.

The UE 115-*a* and the network entity 105-*a* may transmit data via a set of channels or resources on a radio frequency spectrum band. In some cases, however, communications allocated for either the UE 115-*a* or the network entity 105-*a* (or another legitimate device) may be intercepted by the eavesdropping device 205. For example, a downlink signal 210-*a* (which is transmitted by the network entity 105-*a* using a first security configuration 215 and configured for reception by the UE 115-*a*) may be intercepted by the eavesdropping device 205. Additionally or alternatively, an uplink signal 210-*b* (which is transmitted by the UE 115-*a* using the security configuration 215 and destined for reception by the network entity 105-*a* or a different sidelink UE) may be intercepted by the eavesdropping device 205. In some examples, the UE 115-*a* may detect the presence of the eavesdropping device 205 (e.g., using RF leakage detection or another detection method) and may transmit an indication of the identified eavesdropping device 205 to the network entity 105-*a*. In some other examples, the network entity 105-*a* may detect the presence of the eavesdropping device 205 (e.g., using RF leakage detection or another detection method).

Once the eavesdropping device 205 is detected, the network entity 105-*a* (e.g., a gNB or sidelink PLC controller or sidelink controller with agreement with a gNB) may announce the presence of the eavesdropping device 205 using an eavesdropping announcement message 220 sent to the UE 115-*a*. In some examples, the eavesdropping announcement message 220 may be a DCI which includes an RNTI (e.g., eavesdropper_detected_RNTI, or a particular value or range of values for another RNTI) which indicates the eavesdropping announcement. In some other examples, the eavesdropping announcement message 220 may be transmitted on a CORESET which indicates the presence of the eavesdropping device 205.

In some examples, once the eavesdropping device 205 is detected, the network entity 105-*a* may define a procedure to mitigate possible interference associated with the presence of the eavesdropping device 205.

is changed to "The network entity 105-*a* may define a new communication procedure or an updated security configuration 225 before transmitting data or other communications to the UE 115-*a*, secured transmissions 230, and may indicate the new communication procedure or updated security configuration 225 via the eavesdropping announcement message 220. In some examples, the network entity 105-*a* may indicate an updated security configuration 225 which specifies that the data will be sent using a stronger security key. For example, the network entity 105-*a* may select a stronger security key from a plurality of security keys of different strengths. The different security keys may include or support various different types of security schemes, such that a stronger kind of security coding may be implemented when the eavesdropping device 205 is detected. In some cases, the updated security configuration 225 may include securing a single data message using longer security key or by using a type of security key that is known by the network entity 105-*a* to have a stronger (e.g., relatively higher) security capability relative to the first security configuration 215. In some other cases, the network entity may select a stronger security key that implements, for example, an elliptic curve scheme rather than an RSA security scheme. In some other examples, the network entity 105-*a* may use a stronger type of secret key by defining new secret key types (e.g., with different security) to use when the eavesdropping device 205 is detected.

In some examples, the network entity 105-*a* may detect the eavesdropping device 205 that is performing either active or passive eavesdropping attacks during a security key extraction procedure or while sharing a security key with the UE 115-*a*. In such cases, the security key processes may be redone or reconfigured, and the current security key is dropped (e.g., not used or no longer used) by the devices. To cancel the security key and to stop secret key extraction, the network entity 105-*a* may transmit a security key cancellation message. For example, the network entity 105-*a* may transmit a DCI defined by a RNTI that indicates cancellation of the security key (e.g., Stop_SK_extraction_RNTI, or a particular value or range of values for another RNTI). In some other examples, the network entity 105-*a* may transmit control information or signaling on a CORESET that indicates cancellation of the security key by use of the CORESET. In such cases, the network entity 105-*a* may stop the security key extraction procedure and may redo the security key extraction at a different time in a more secure fashion.

In some other examples, if the network entity 105-*a* detects an eavesdropping attack during an ongoing data transmission, the network entity 105-*a* may interrupt or cancel the data transmission by transmitting a DCI (e.g., a modified DCI 2_1 or new DCI if the network entity 105-*a* is the detector) to the UE. In cases that the UE 115-*a* is the detector, it may transmit an uplink signal with configured resources, and may receive an indication to cancel the ongoing transmissions. In some examples, the DCI indicating the cancellation may be defined by a new RNTI (e.g., Stop_data_Tx_due_to_security_attacks_RNTI, or a particular value or range of values for another RNTI) or a CORESET on which the DCI is transmitted. The cancellation may stop the receiving and transmitting of data to reduce the probability that the data is hacked by the eavesdropping device 205.

In some other examples, the network entity 105-*a* may dedicate one or more BWPs that the UE 115-*a* may switch to once the eavesdropping attack is detected, and the one or more BWPs can be used based on an indication from the network entity 105-*a* for uplink communications, downlink communications, or both. In some cases, the one or more BWPs may be associated with a higher security configuration, one or more authentication messages, and artificial noise injection.

In some other examples, the updated security configuration 225 may indicate that the data is to be sent on a more secure frequency band (e.g., relative to security configuration 215), a more secured set of resource blocks, a more secure set of resources, or using a more secure resource pool. In some cases, the network entity 105-*a* may identify the multiple bands with a certain security based on the history of communications with the UE 115-*a*, based on a history of eavesdropping detectability, or both.

In some examples, there might be several bands or CCs where each CC can use different secrecy codes associated with respective security quality of service. The network entity may then deactivate or reduce a type of traffic on a band or CC based on security requirements if the band or CC is under attack by the eavesdropping device 205. Additionally or alternatively, bands or CCs with relatively stronger security schemes (or with little to no eavesdropping) may be selected for use by the network entity 105-*a*, while bands or CCs with lower security schemes may not be used (e.g., unless there is no security needed for traffic). For example, a first CC (e.g., CC1) that has a lower security level may support communication of reference signaling such as CSI-RS or sounding reference signal (SRS) or normal control signals, while a second CC (e.g., CC2) that has a higher security level than the first CC may support communication of data.

In some other examples, the updated security configuration 225 may indicate added multi-layer security for the transmission of data. For example, the network entity 105-*a* may add MAC+PHY+L3 security after detecting the eavesdropping device 205. In some examples, the network entity 105-*a* may enable physical layer (e.g., PHY) security and MAC-CE security with one or more security keys. In some other examples, the network entity 105-*a* may secure unsecured channels (e.g., DCI, UCI, SSB, SCI, PSFCH) that are close to the eavesdropping device 205.

In some other examples, the updated security configuration 225 may include an addition of an authentication signature to each physical channel (e.g., PDSCH, PUSCH, PSSCH) transmission that is vulnerable to eavesdropping by the eavesdropping device 205. For example, once an eavesdropping attack is detected, the network entity 105-*a* may enable one or more PHY authentication signatures (e.g., an addition of a digital signature or commitment to each code block group (CBG), set of code blocks (CBs), single CB, TBs, or any combination thereof). In such examples, legitimate receiving devices such as the UE 115-*a* may know that the received signal is legitimate based on the authentication signature.

For example, in some cases a message (m) may be transmitted by a transmitting device (such as the network entity 105-*a*) in the form (m)→H(m)→$H(m)^e$, where e is a private security key. The transmitting device such as the network entity 105-*a* may transmit the message (m) and $H(m)^e$, and the receiving device such as the UE 115-*a* determines (m) and $H(m)^e$. The UE 115-*a* may also identify a public security key d and may take $H(m)^e$ to the power of d to determine the correct version of the message. For example, e and d may be designed such that (e)(d)=1, and $H(m)^{ed}=H(m)$.

In some other examples, the network entity 105-*a* may enable artificial noise based security where artificial noise is sent with a message based on a shared security key, and the noise is canceled at the receiver side (e.g., at the UE 115-*a*). In some examples, when eavesdropping is detected, artificial noise injection may be enabled where smart jamming (e.g., a creation of interference) to avoid eavesdropping is used.

Figure 3:
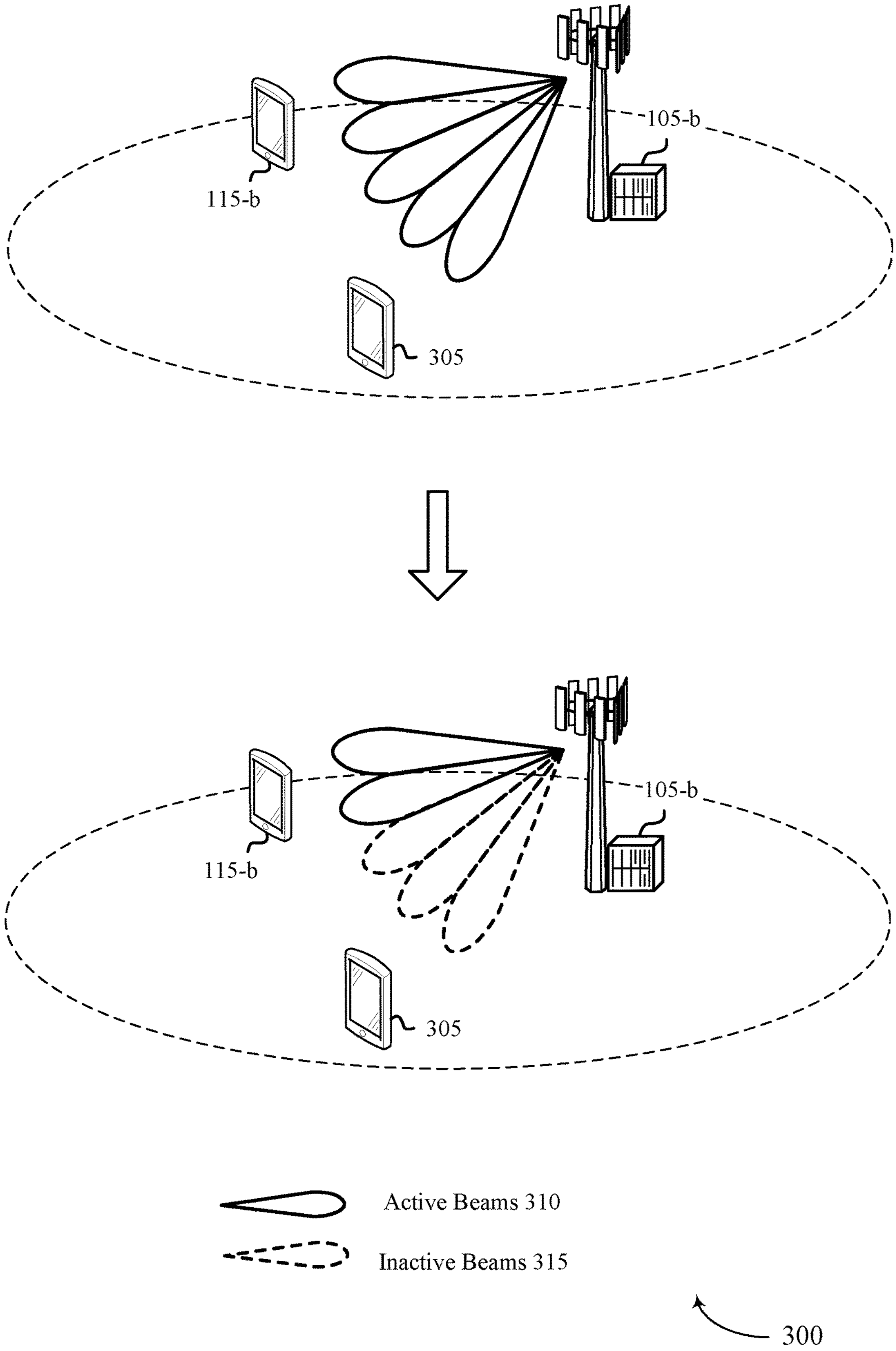

FIG. 3 illustrates an example of a wireless communications system 300 that supports eavesdropping detection and methods to mitigate eavesdropping in accordance with one or more aspects of the present disclosure. For example, wireless communications system 300 may support communications between a UE 115-*b* and a network entity 105-*b*, each of which may be examples of UE 115 and network entities 105 described with reference to FIGS. 1 and 2. In addition, wireless communications system 300 may include one or more eavesdropping devices 305, which may be UE or network devices as described herein.

The UE 115-*b* and the network entity 105-*b* may transmit data via a set of active beams 310. In some cases, however, communications allocated for either the UE 115-*b* or the network entity 105-*b* (or another legitimate device) may be intercepted by the eavesdropping device 305. For example, the beams 310 (or a subset of the beams 310) may be intercepted or eavesdropped by the eavesdropping device 305. In some examples, the UE 115-*b* may detect the presence of the eavesdropping device 305 (e.g., using RF leakage detection or another detection method) and may transmit an indication of the identified eavesdropping device 305 to the network entity 105-*b*. In some other examples, the network entity 105-*b* may detect the presence of the eavesdropping device 305 (e.g., using RF leakage detection or another detection method).

Once the eavesdropping device 305 is detected, the network entity 105-*b* may announce the presence of the eavesdropping device 305 using an eavesdropping announcement message, which may further include an indication of a procedure to mitigate possible interference associated with the presence of the eavesdropping device 205. The network entity 105-*b* may define a new communication procedure or an updated security configuration that forces a beam restriction (or defines a set of preferred beams) around the relative location of the eavesdropping device 305. For example, the network entity 105-*b* may determine to deactivate a subset of the active beams 310 (e.g., inactive beams 315) such that sensitive data is not sent or received via the restricted or inactive beams 315 at least for a time period in which the eavesdropping device 305 is present. The beam restriction may further define preferred beams, which may be a type of beam restriction that the network entity 105-*b* uses to send data into specific routes to avoid the relative location of the eavesdropping device 305. The beam restriction may also apply to beams that the UE 115-*b* uses to transmit data to the network entity 105-*b*.

Additionally or alternatively, the network entity 105-*b*, the UE 115-*b*, or both, may send data using different antenna ports and make smaller sized transport blocks for carrying sensitive data. In such cases, each transport block passes through a different transmission port and could be reflected by a different reconfigurable intelligent surface (RIS), relay, or precoder. In some other examples, an updated security configuration may enable multiple panels or transmission reception points (TRPs) to send pieces of data or CBs (or pieces of a CB) based on the presence of the eavesdropping device 305. For example, each CB may be sent on a different TRP, antenna panel, or transmission port, or set of transmission ports. In this example, a transport block may be divided into CBGs, and a CBG is divided into CBGs. The transmitting device such as the network entity 105-*b* may transmit each CB (or each CBG) in a different band or CC, via a different relaying route, a different TRP, antenna panel, transmission port, or any combination thereof.

Figure 4:
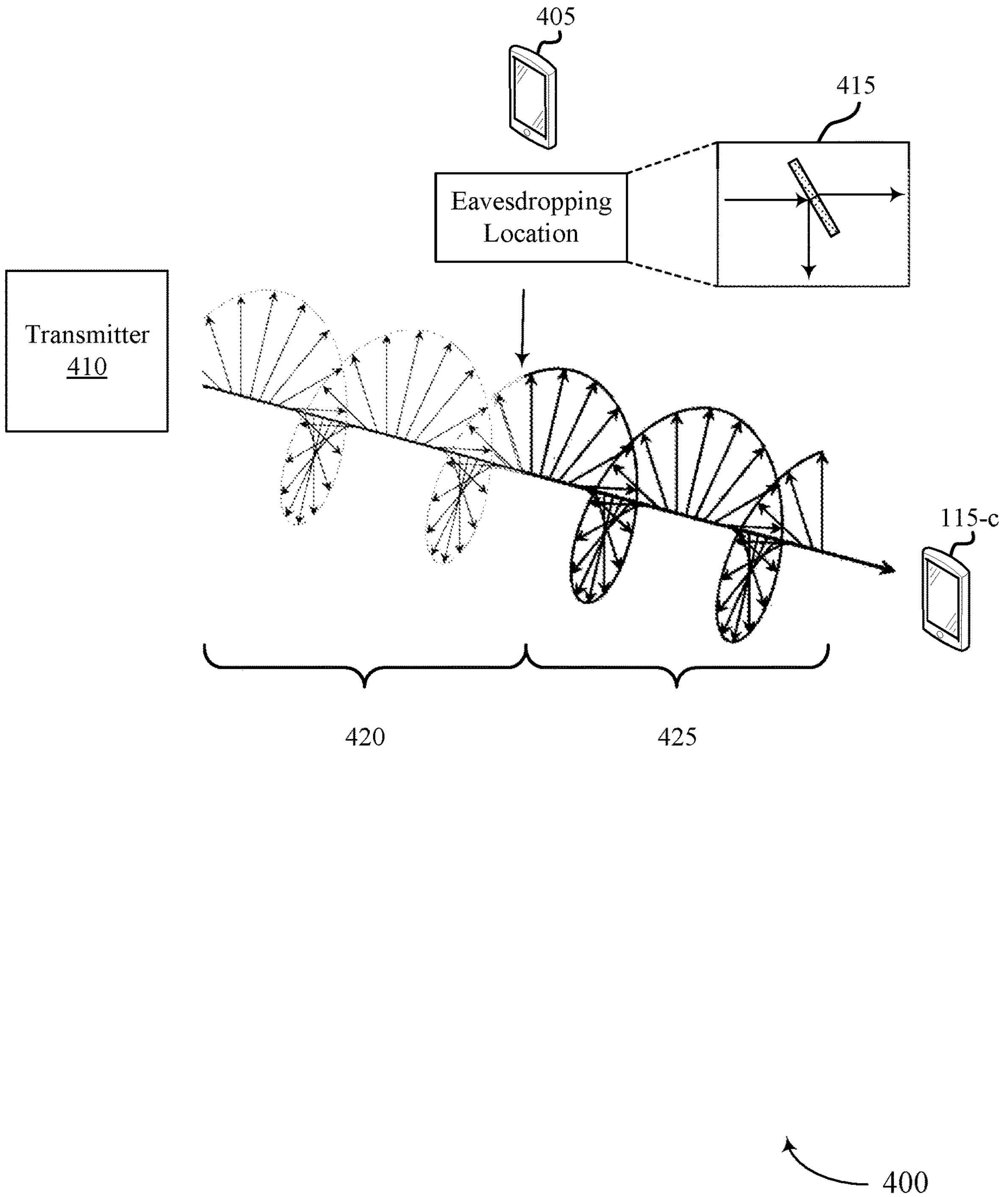

FIG. 4 illustrates an example of a wireless communications system 400 that supports eavesdropping detection and methods to mitigate eavesdropping in accordance with one or more aspects of the present disclosure. For example, wireless communications system 400 may support communications between a UE 115-*c* and a transmitting device 410, each of which may be examples of UE 115 and network entities 105 described with reference to FIGS. 1 through 3. In addition, wireless communications system 400 may include one or more eavesdropping devices 405, which may be UE or network devices as described herein.

In some implementations, a transmitter 410 may communicate with a UE 115-*c* using OAM or line of sight-MIMO (LOS-MIMO) techniques. In some cases, however, communications intended for the UE 115-*c* (or another legitimate device) may be intercepted by the eavesdropping device 405. In presence of OAM (and when there is the eavesdropping device 405 attempts to intercept communications), the UE 115-*c* may perform a procedure of local eavesdropping detection.

For example, the UE 115-*c* may check the polarization characteristics among the multiple OAM modes to observe possible changes made by the eavesdropping device 405. In such examples, the eavesdropping device 405 may have inserted an instrument in the signal propagation path (such as a beam-splitter eavesdropping device 415), which may change the polarization characteristics of the wave form. In some examples, the UE 115-*c* may check the relative strength and phase between two polarized modes 420 and 425 of the same OAM mode and compare the relative strength and phase with the polarization characteristics of the signal as originally transmitted (and is sent to the UE 115-*c* as control information). Then, if the difference between the relative strength and phase of the received and transmitted signal is beyond a certain threshold, the UE 115-*c* may identify the presence of the eavesdropping device 405.

In some implementations, for example, the eavesdropping device 405 may attempt to insert a beam-splitter type eavesdropping device 415 to intercept signals. The beam splitting type eavesdropping, however, may be detectable by the UE 115-*c* based on a change in polarization modes (from polarization mode 420 to 425) since polarization is not preserved after beam-splitting for millimeter wave communications.

In some examples, the UE 115-*c* may implement a single polarization configuration for eavesdropping detection. For example, circular polarization may have amplitude and angle preservation for all rotation angles along the z-axis with only a single transmission polarization configuration. In such example, signaling of polarization per beam for transmissions may notify the UE 115-*c* of the initial polarization information so that the UE 115-*c* may identify changes in polarization associated with a possible eavesdropping attack. For example, the UE 115-*c* may receive one or more bits of information identifying whether circular polarization is used (e.g., with or without information on rotation direction left handed or right handed rotation or other directional information).

In some other examples, the UE 115-*c* may implement support eavesdropping detection when multiple polarization configurations are configured over time. For example, the multiple polarization configurations may be associated with a fixed pattern with two polarization configurations interlaced in time (e.g., two perpendicular linear polarizations, left-handed and right-handed circular polarizations), and may be pseudorandom to increase diversity. In such examples, the polarization pattern may be known and in-sync between the transmitter 410 and the UE 115-*c* such that the UE 115-*c* may determine whether the pattern has changed as a result of a possible eavesdropping device 405. In some examples, the polarization pattern may be hard coded at the UE 115-*c*, or may be signaled to the UE 115-*c*, and may be configured per-beam or may vary across beams.

In some examples, the transmitter 410, the UE 115-*c*, or both, may send data using different OAM modes based on the identified presence of the eavesdropping device 405.

Figure 5:
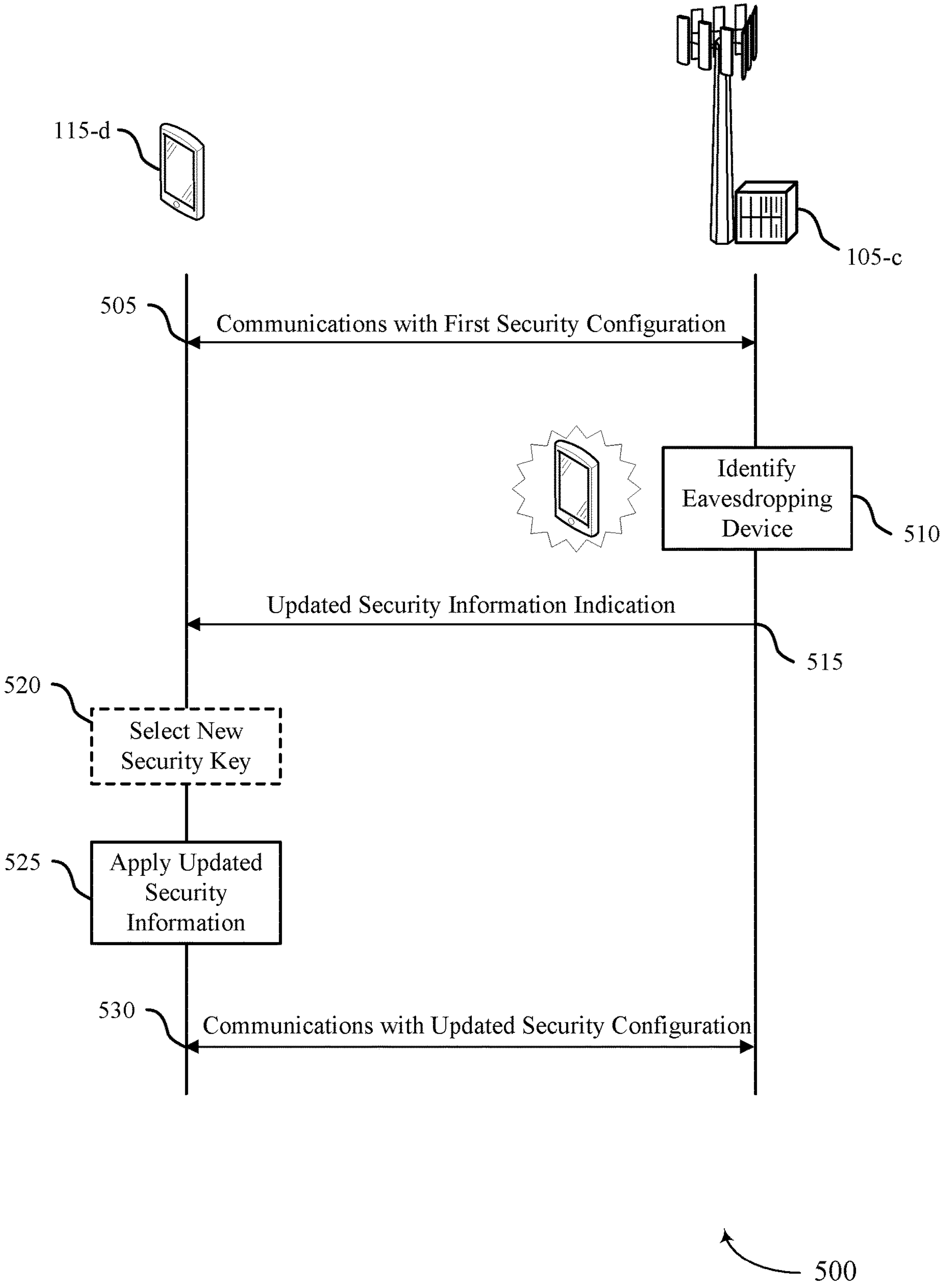
FIG. 5 illustrates an example of a process flow that supports eavesdropping detection and methods to mitigate eavesdropping in accordance with one or more aspects of the present disclosure.

FIG. 5 illustrates an example of a process flow 500 that supports eavesdropping detection and methods to mitigate eavesdropping in accordance with one or more aspects of the present disclosure. Process flow 500 may illustrate communications between a UE 115-*d* and a network entity 105-*c*, each of which may be examples of devices (e.g., UEs, network entities) described herein. The process flow 500 may also include an eavesdropping device, which may be an example of a UE or a network device as described herein. In the following description of the process flow 500, the operations between the UE 115-*d* and the network entity 105-*c* may be communicated in a different order than the example order shown, or the operations performed by the UE 115-*d* and the network entity 105-*c* may be performed in different orders or at different times. Some operations may also be omitted from the process flow 500, and other operations may be added to the process flow 500.

At 505, the UE 115-*d* may communicate with the network entity 105-*c* using a first security key of a first security configuration for encrypting first messages to communicate between the UE 115-*d* and the network entity 105-*c*.

At 510, the network entity 105-*c* may identify an eavesdropping device by various techniques described herein, for example, the network entity 105-*c* may receive an indication of the eavesdropping device from the UE 115-*d*, or the network entity 105-*c* may detect RF leakage or other signatures of an eavesdropping device on a wireless channel.

At 515, the UE 115-*d* may receive a control message that indicates that a wireless device (e.g., the eavesdropping device) has been detected attempting to intercept the encrypted first messages communicated between the UE 115-*d* and the network entity 105-*c*. The control message may in some examples be a DCI encoded with a eavesdropping identifier RNTI, or the control message may be at least part of a CORESET. In some examples, the control message may indicate a new or updated security configuration to use based on the detected eavesdropping device. In some cases, the control message may be a cancellation message indicating that the UE is to cancel the use of the first security key of the first security configuration. Additionally or alternatively, the control message may instruct the UE 115-*d* to refrain from communicating at least a portion of the encrypted first messages.

At 520, the UE 115-*d* may select or apply a second security key from a plurality of security keys according to the new or updated security configuration, where different security keys of the plurality of security keys correspond to different security strengths, different security types, or both.

At 525, the UE 115-*d* may switch from the first security configuration to the second security configuration responsive to receiving the control message indicating that the eavesdropping wireless device has been detected, where the second security key of the second security configuration is associated with a greater security strength than the first security key of the first security configuration. In some examples, the UE 115-*d* may switch from communicating the first messages encrypted using a first authentication signature associated with the first security configuration to communicating the second messages encrypted using a second authentication signature associated with the second security configuration based on receiving the control message. In such examples, the second authentication signature may be associated with a hashing function indicated by the received control message, and is associated with a greater security strength than the first authentication signature.

In some examples, the UE 115-*d* may switch from communicating the encrypted first messages using a first set of resources associated with the first security configuration to communicating the encrypted second messages using a second set of resources associated with the second security configuration based on the received control messages. In such examples, the second set of resources may have a greater security strength than the first set of resources, and the first set of resources may include one or more of a first set of frequency resources, time resources, beams, antenna ports, transmission modes, or any combination thereof. The second set of resource may then include a second set of frequency resources, time resources, beams, antenna ports, transmission modes, or any combination thereof, different from the first set of resources.

In some other examples, the UE 115-*d* may switch from communicating the encrypted first messages on a first band in accordance with the first security configuration to communicating a first subset of the encrypted second messages in a second band and a second subset of the encrypted second messages in a third band in accordance with the second security configuration. In such examples, the second band and the third band are different from the first band and are associated with a higher security strength than the first band.

In some examples, the control message indicates that the second security configuration that is associated with increased PHY security, MAC layer security, user plane security, control plane security, or any combination thereof. In some other examples, the UE 115-*d* may communicate the encrypted second messages using the second security which indicates an addition of a noise signal to the encrypted second messages for added security.

In some other examples (e.g., in cases where the UE 115-*d* and the network entity 105-*c* support communications using OAM), the UE 115-*d* may identify a change in one or more polarization modes associated with communications of the encrypted first messages where the change is indicative of the wireless device attempting to intercept the encrypted first messages as an eavesdropping device. The UE 115-*d* may then communicate the encrypted second messages using the second security configuration based on the change in the one or more polarization modes for added security.

At 530, the UE 115-*d* may communicate with the network entity 105-*c* second messages that are encrypted using the second security key of the second security configuration In some other examples, the UE 115-*d* may switch from communicating the encrypted first messages with the network entity 105-*c* to communicating the encrypted second messages with a different network entity in accordance with the second security configuration.

Figure 6:
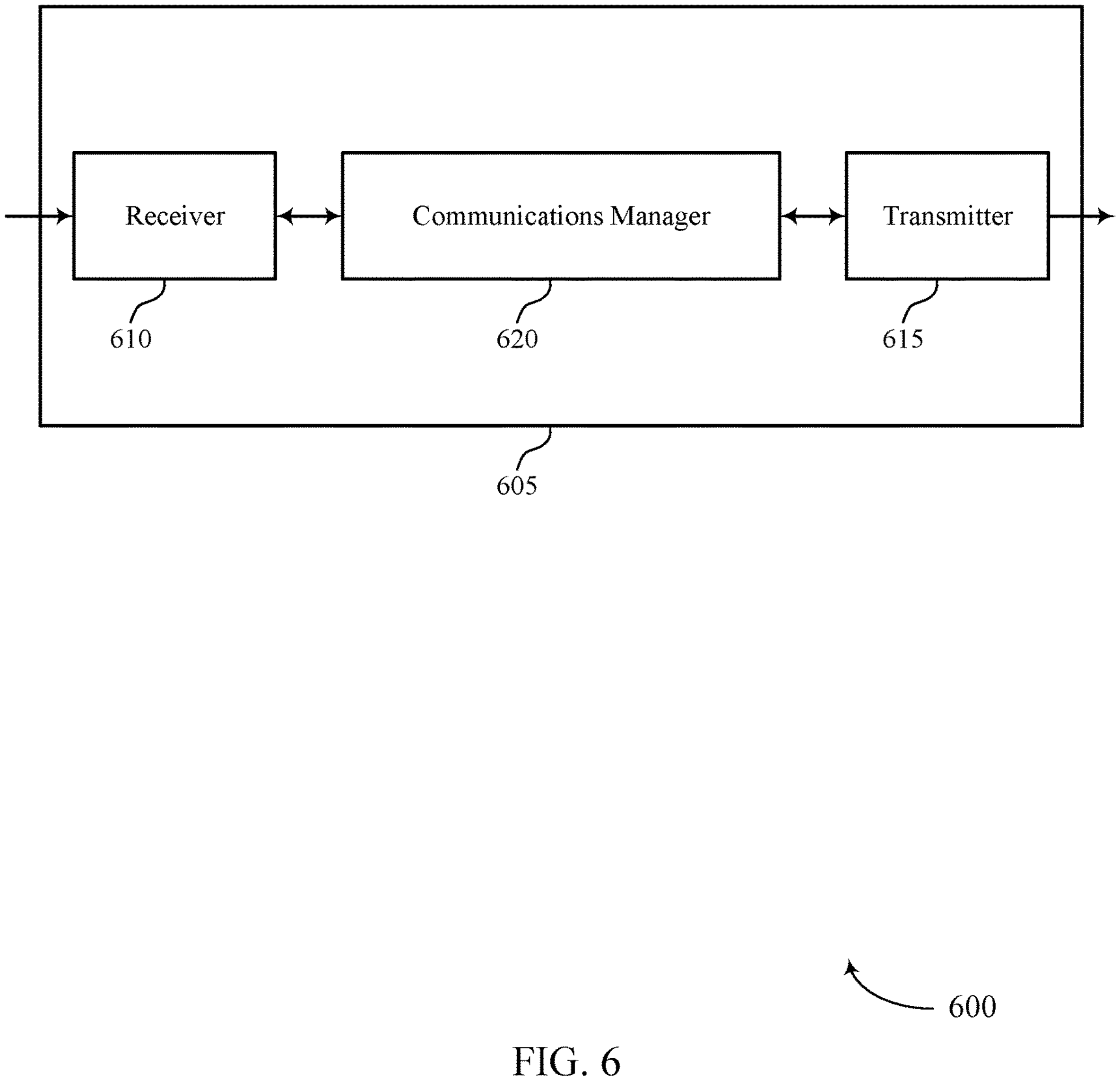
FIGS. 6 and 7 show block diagrams of devices that support eavesdropping detection and methods to mitigate eavesdropping in accordance with one or more aspects of the present disclosure.

FIG. 6 shows a block diagram 600 of a device 605 that supports eavesdropping detection and methods to mitigate eavesdropping in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to eavesdropping detection and methods to mitigate eavesdropping). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to eavesdropping detection and methods to mitigate eavesdropping). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of eavesdropping detection and methods to mitigate eavesdropping as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. For example, the communications manager 620 may be configured as or otherwise support a means for communicating with a network entity using a first security key of a first security configuration for encrypting first messages to communicate between the UE and the network entity. The communications manager 620 may be configured as or otherwise support a means for receiving a control message that indicates that a wireless device has been detected attempting to intercept the encrypted first messages communicated between the UE and the network entity. The communications manager 620 may be configured as or otherwise support a means for communicating, with the network entity, second messages encrypted using a second security key of a second security configuration based on switching from the first security configuration to the second security configuration responsive to receiving the control message indicating that the wireless device has been detected, the second security key associated with a greater security strength than the first security key.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for increased communications security, increased signaling reliability, and increased device coordination.

Figure 7:
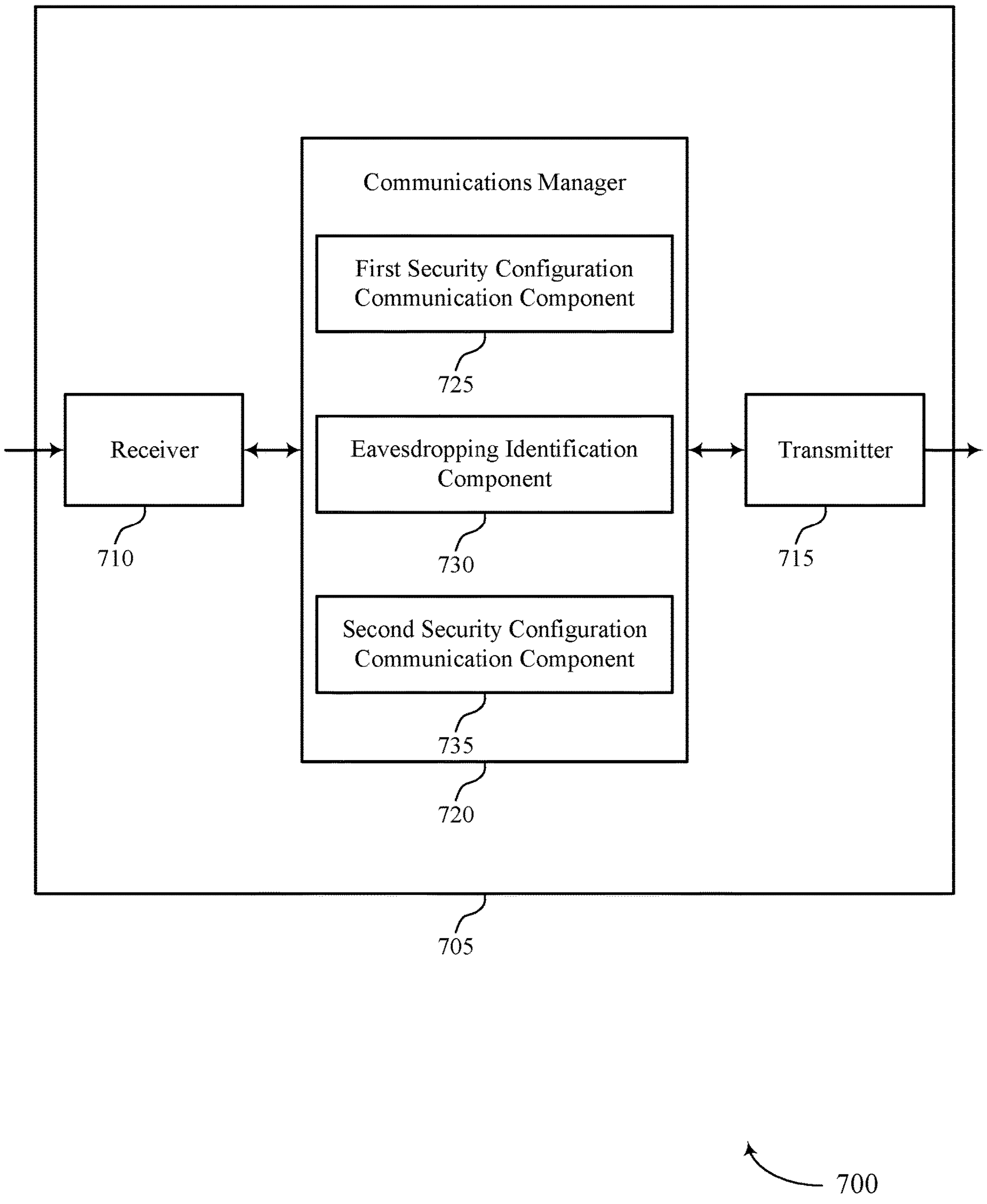

FIG. 7 shows a block diagram 700 of a device 705 that supports eavesdropping detection and methods to mitigate eavesdropping in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to eavesdropping detection and methods to mitigate eavesdropping). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to eavesdropping detection and methods to mitigate eavesdropping). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of eavesdropping detection and methods to mitigate eavesdropping as described herein. For example, the communications manager 720 may include a first security configuration communication component 725, an eavesdropping identification component 730, a second security configuration communication component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. The first security configuration communication component 725 may be configured as or otherwise support a means for communicating with a network entity using a first security key of a first security configuration for encrypting first messages to communicate between the UE and the network entity. The eavesdropping identification component 730 may be configured as or otherwise support a means for receiving a control message that indicates that a wireless device has been detected attempting to intercept the encrypted first messages communicated between the UE and the network entity. The second security configuration communication component 735 may be configured as or otherwise support a means for communicating, with the network entity, second messages encrypted using a second security key of a second security configuration based on switching from the first security configuration to the second security configuration responsive to receiving the control message indicating that the wireless device has been detected, the second security key associated with a greater security strength than the first security key.

Figure 8:
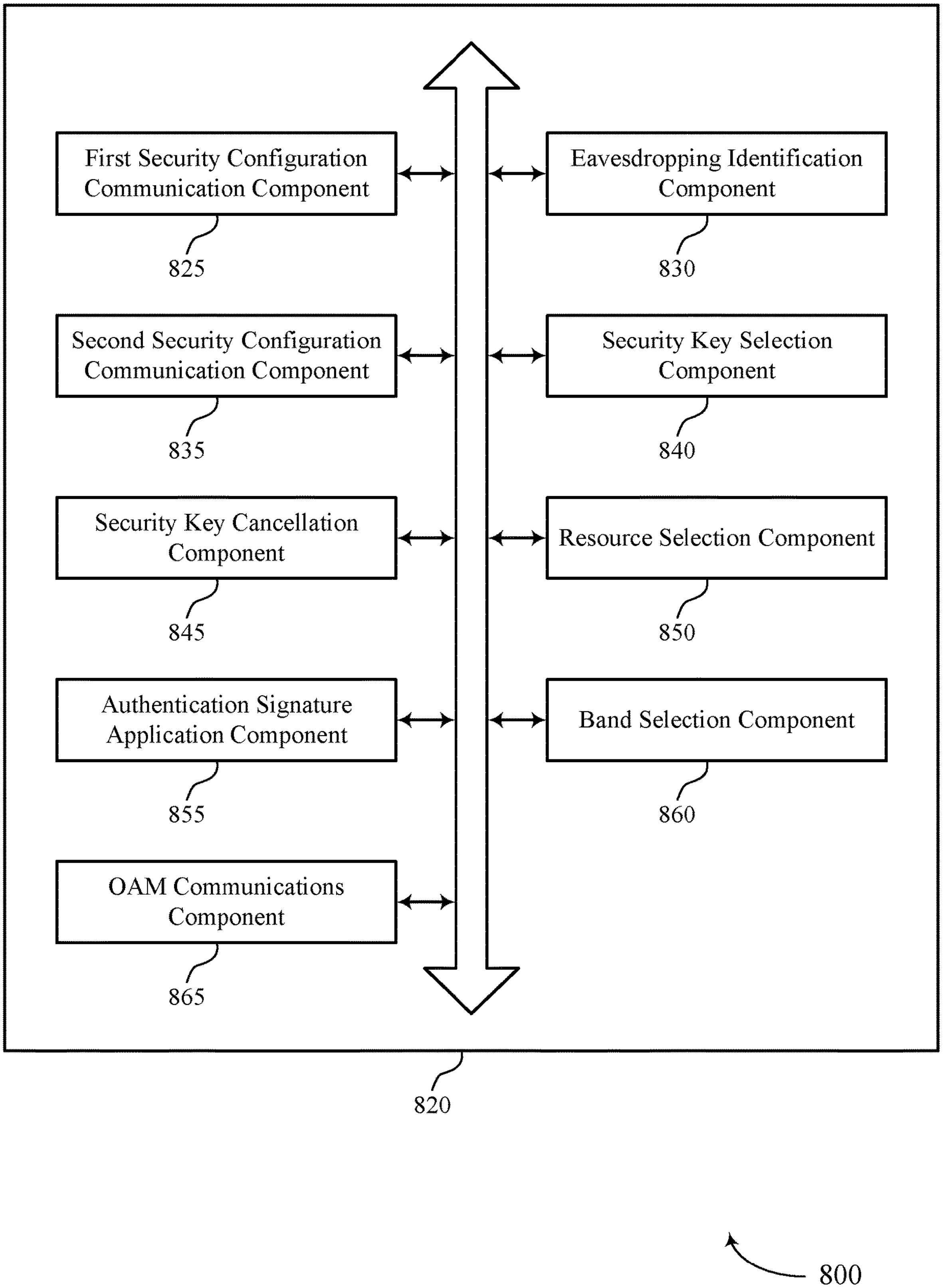
FIG. 8 shows a block diagram of a communications manager that supports eavesdropping detection and methods to mitigate eavesdropping in accordance with one or more aspects of the present disclosure.

FIG. 8 shows a block diagram 800 of a communications manager 820 that supports eavesdropping detection and methods to mitigate eavesdropping in accordance with one or more aspects of the present disclosure. The communications manager 820 may be an example of aspects of a communications manager 620, a communications manager 720, or both, as described herein. The communications manager 820, or various components thereof, may be an example of means for performing various aspects of eavesdropping detection and methods to mitigate eavesdropping as described herein. For example, the communications manager 820 may include a first security configuration communication component 825, an eavesdropping identification component 830, a second security configuration communication component 835, a security key selection component 840, a security key cancellation component 845, a resource selection component 850, an authentication signature application component 855, a band selection component 860, an OAM communication component 865, or any combination thereof. Each of these components may communicate, directly or indirectly, with one another (e.g., via one or more buses).

The communications manager 820 may support wireless communication at a UE in accordance with examples as disclosed herein. The first security configuration communication component 825 may be configured as or otherwise support a means for communicating with a network entity using a first security key of a first security configuration for encrypting first messages to communicate between the UE and the network entity. The eavesdropping identification component 830 may be configured as or otherwise support a means for receiving a control message that indicates that a wireless device has been detected attempting to intercept the encrypted first messages communicated between the UE and the network entity. The second security configuration communication component 835 may be configured as or otherwise support a means for communicating, with the network entity, second messages encrypted using a second security key of a second security configuration based on switching from the first security configuration to the second security configuration responsive to receiving the control message indicating that the wireless device has been detected, the second security key associated with a greater security strength than the first security key.

In some examples, the security key selection component 840 may be configured as or otherwise support a means for selecting the second security key from a set of multiple security keys according to the second security configuration, different security keys of the set of multiple security keys corresponding to different security strengths, different security types, or both.

In some examples, to support receiving the control message, the security key cancellation component 845 may be configured as or otherwise support a means for receiving the control message indicating for the UE to cancel the use of the first security key of the first security configuration.

In some examples, the resource selection component 850 may be configured as or otherwise support a means for switching, based on the received control message, from communicating the encrypted first messages using a first set of resources associated with the first security configuration to communicating the encrypted second messages using a second set of resources associated with the second security configuration, where the second set of resources have a greater security strength than the first set of resources.

In some examples, the first set of resources include one or more of a first set of frequency resources, time resources, beams, antenna ports, transmission modes, or any combination thereof. In some examples, the second set of resources include a corresponding one or more of a second set of frequency resources, time resources, beams, antenna ports, transmission modes, or any combination thereof, different from the first set of resources.

In some examples, the control message indicates the second security configuration that is associated with increased PHY security, MAC layer security, user plane security, control plane security, or any combination thereof.

In some examples, the authentication signature application component 855 may be configured as or otherwise support a means for switching, based on the received control message, from communicating the first messages encrypted using a first authentication signature associated with the first security configuration to communicating the second messages encrypted using a second authentication signature associated with the second security configuration, where the second authentication signature is associated with a hashing function indicated by the received control message, and is associated with a greater security strength than the first authentication signature.

In some examples, the second security configuration communication component 835 may be configured as or otherwise support a means for communicating, based on the received control message, the encrypted second messages using the second security configuration, where the second security configuration indicates an addition of a noise signal to the encrypted second messages.

In some examples, the second security configuration communication component 835 may be configured as or otherwise support a means for switching, based on the received control message, from communicating the encrypted first messages with the network entity in accordance with the first security configuration to communicating the encrypted second messages with a different network entity in accordance with the second security configuration.

In some examples, the band selection component 860 may be configured as or otherwise support a means for switching, based on the received control message, from communicating the encrypted first messages on a first band in accordance with the first security configuration to communicating a first subset of the encrypted second messages in a second band and a second subset of the encrypted second messages in a third band in accordance with the second security configuration, where the second band and the third band are different from the first band and are associated with a higher security strength than the first band.

In some examples, the second security configuration communication component 835 may be configured as or otherwise support a means for refraining from communicating at least a portion of the encrypted first messages based on the received control message.

In some examples, the OAM communication component 865 may be configured as or otherwise support a means for identifying a change in one or more polarization modes associated with communications of the encrypted first messages, the change indicative of the wireless device attempting to intercept the encrypted first messages. In some examples, the OAM communication component 865 may be configured as or otherwise support a means for communicating the encrypted second messages using the second security configuration based on the change in the one or more polarization modes.

In some examples, the control message includes a downlink control information message encoded with a radio network temporary identifier, transmitted on a control resource set, or both, indicative of the wireless device attempting to intercept the encrypted first messages.

Figure 9:
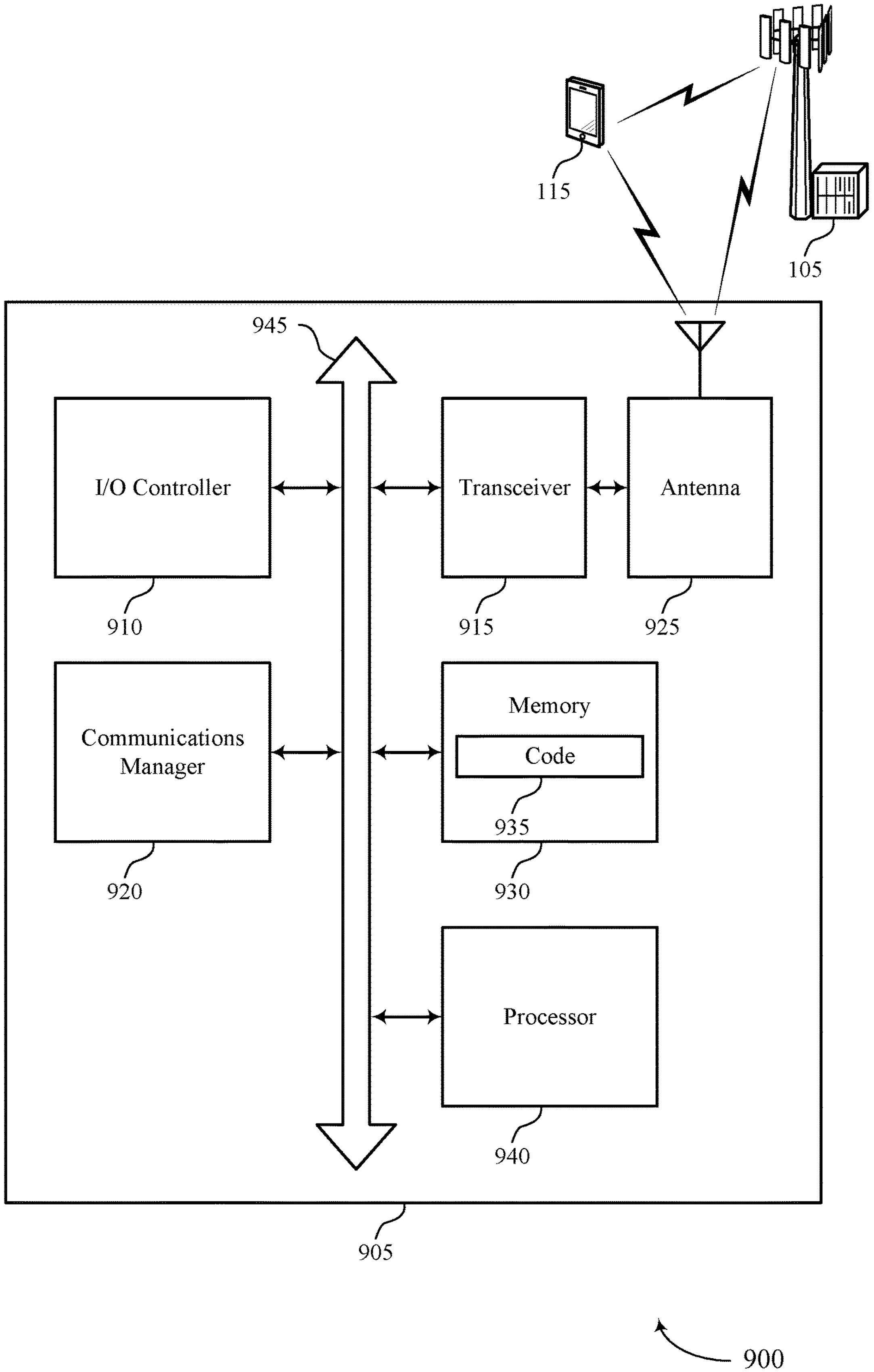
FIG. 9 shows a diagram of a system including a device that supports eavesdropping detection and methods to mitigate eavesdropping in accordance with one or more aspects of the present disclosure.

FIG. 9 shows a diagram of a system 900 including a device 905 that supports eavesdropping detection and methods to mitigate eavesdropping in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting eavesdropping detection and methods to mitigate eavesdropping). For example, the device 905 or a component of the device 905 may include a processor 940 and memory 930 coupled with or to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for communicating with a network entity using a first security key of a first security configuration for encrypting first messages to communicate between the UE and the network entity. The communications manager 920 may be configured as or otherwise support a means for receiving a control message that indicates that a wireless device has been detected attempting to intercept the encrypted first messages communicated between the UE and the network entity. The communications manager 920 may be configured as or otherwise support a means for communicating, with the network entity, second messages encrypted using a second security key of a second security configuration based on switching from the first security configuration to the second security configuration responsive to receiving the control message indicating that the wireless device has been detected, the second security key associated with a greater security strength than the first security key.

By including or configuring the communications manager 920 in accordance with examples as described herein, the device 905 may support techniques for improved communication reliability, improved coordination between devices, increased data security, improved interference mitigation from eavesdropping devices, dynamic security configuration updating, and increased utilization of communications resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of eavesdropping detection and methods to mitigate eavesdropping as described herein, or the processor 940 and the memory 930 may be otherwise configured to perform or support such operations.

Figure 10:
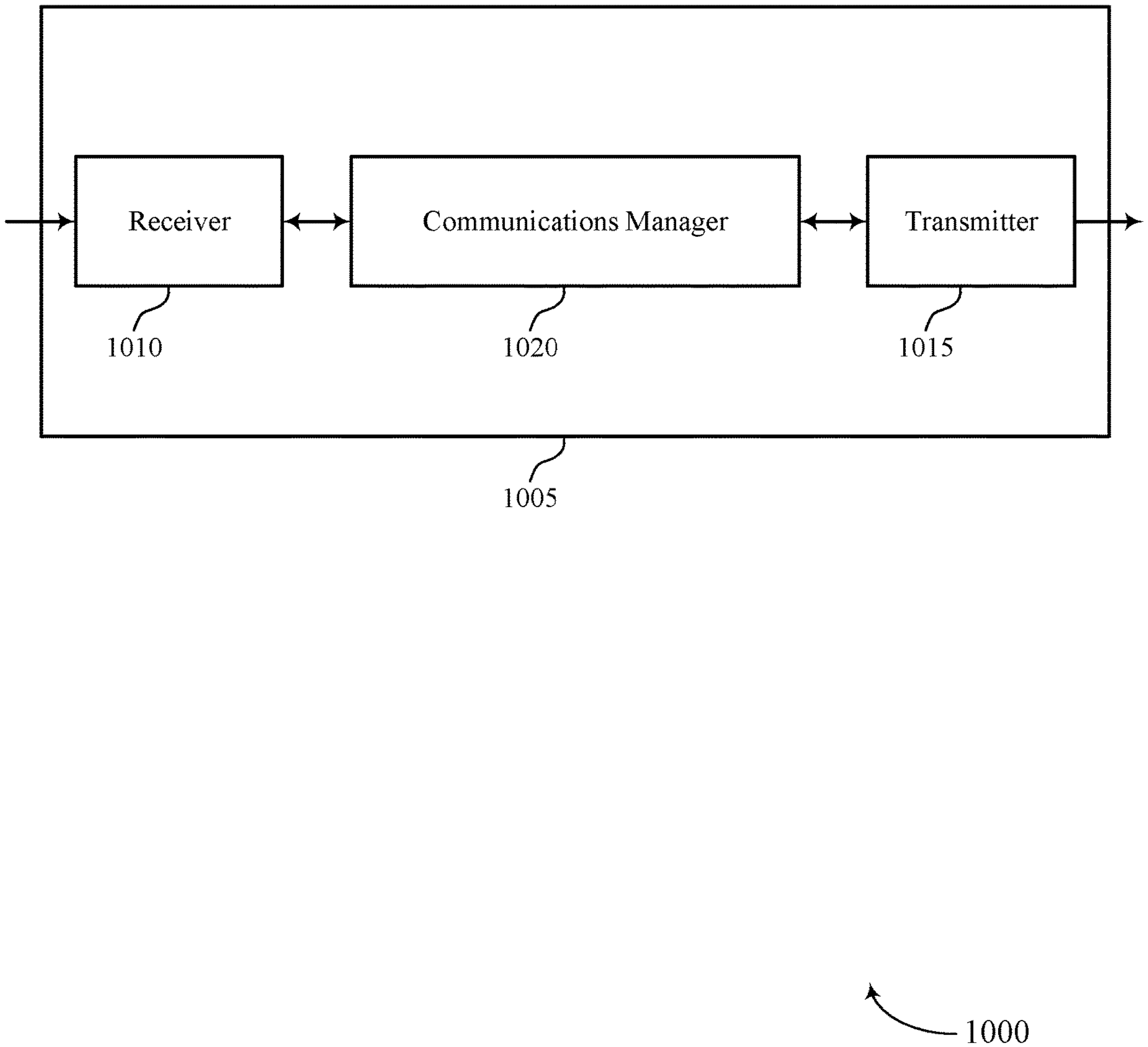
FIGS. 10 and 11 show block diagrams of devices that support eavesdropping detection and methods to mitigate eavesdropping in accordance with one or more aspects of the present disclosure.

FIG. 10 shows a block diagram 1000 of a device 1005 that supports eavesdropping detection and methods to mitigate eavesdropping in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of eavesdropping detection and methods to mitigate eavesdropping as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. For example, the communications manager 1020 may be configured as or otherwise support a means for communicating with a UE using a first security key of a first security configuration for encrypting first messages to communicate between the network entity and the UE. The communications manager 1020 may be configured as or otherwise support a means for transmitting, to the UE, a control message that indicates that a wireless device has been detected attempting to intercept the encrypted first messages communicated between the network entity and the UE. The communications manager 1020 may be configured as or otherwise support a means for communicating, with the UE, second messages encrypted using a second security key of a second security configuration based on switching from the first security configuration to the second security configuration responsive to transmitting the control message indicating that the wireless device has been detected, the second security key associated with a greater security strength than the first security key.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for increased communications security, increased signaling reliability, and increased device coordination.

Figure 11:
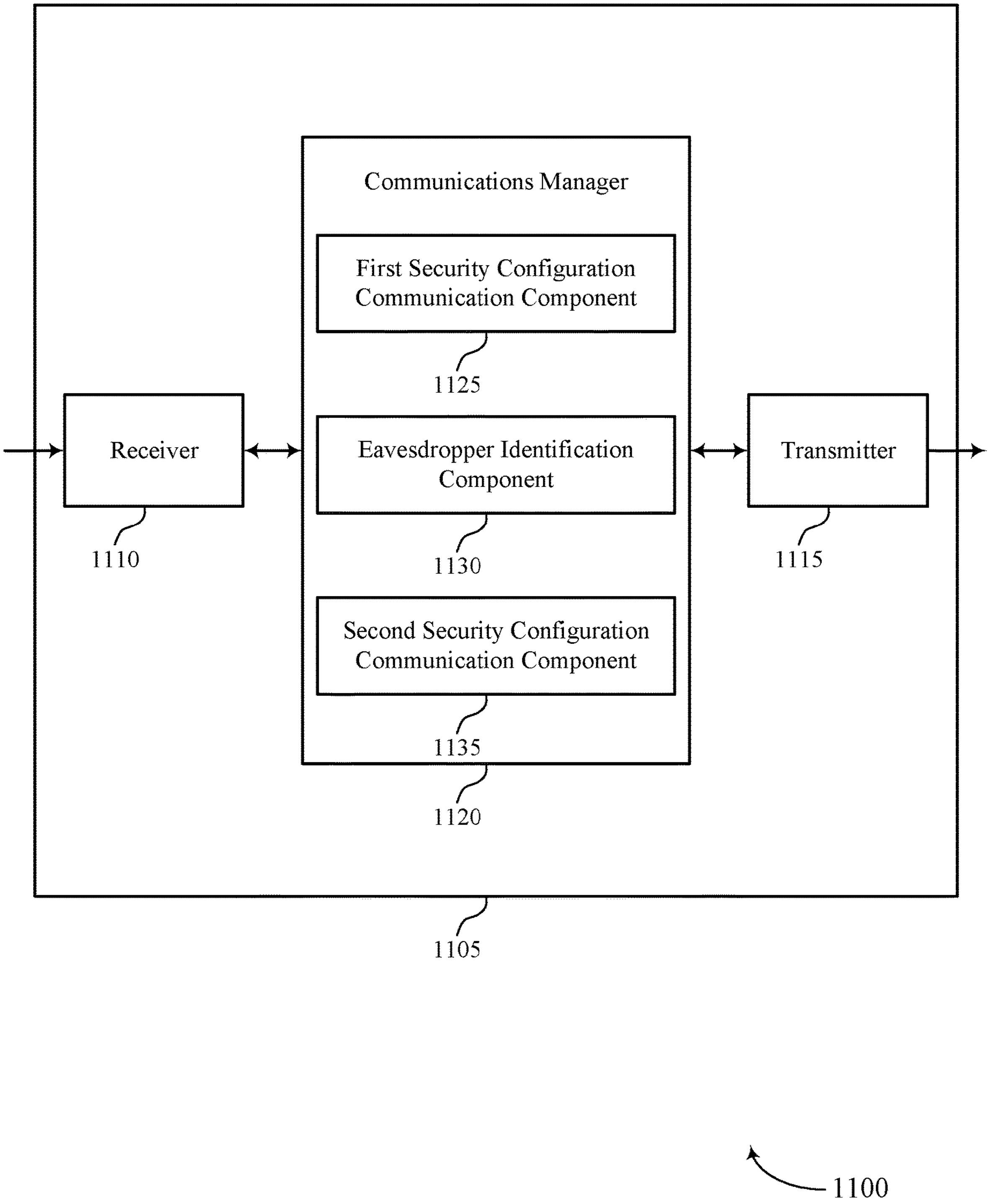

FIG. 11 shows a block diagram 1100 of a device 1105 that supports eavesdropping detection and methods to mitigate eavesdropping in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of eavesdropping detection and methods to mitigate eavesdropping as described herein. For example, the communications manager 1120 may include a first security configuration communication component 1125, an eavesdropper identification component 1130, a second security configuration communication component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. The first security configuration communication component 1125 may be configured as or otherwise support a means for communicating with a UE using a first security key of a first security configuration for encrypting first messages to communicate between the network entity and the UE. The eavesdropper identification component 1130 may be configured as or otherwise support a means for transmitting, to the UE, a control message that indicates that a wireless device has been detected attempting to intercept the encrypted first messages communicated between the network entity and the UE. The second security configuration communication component 1135 may be configured as or otherwise support a means for communicating, with the UE, second messages encrypted using a second security key of a second security configuration based on switching from the first security configuration to the second security configuration responsive to transmitting the control message indicating that the wireless device has been detected, the second security key associated with a greater security strength than the first security key.

Figure 12:
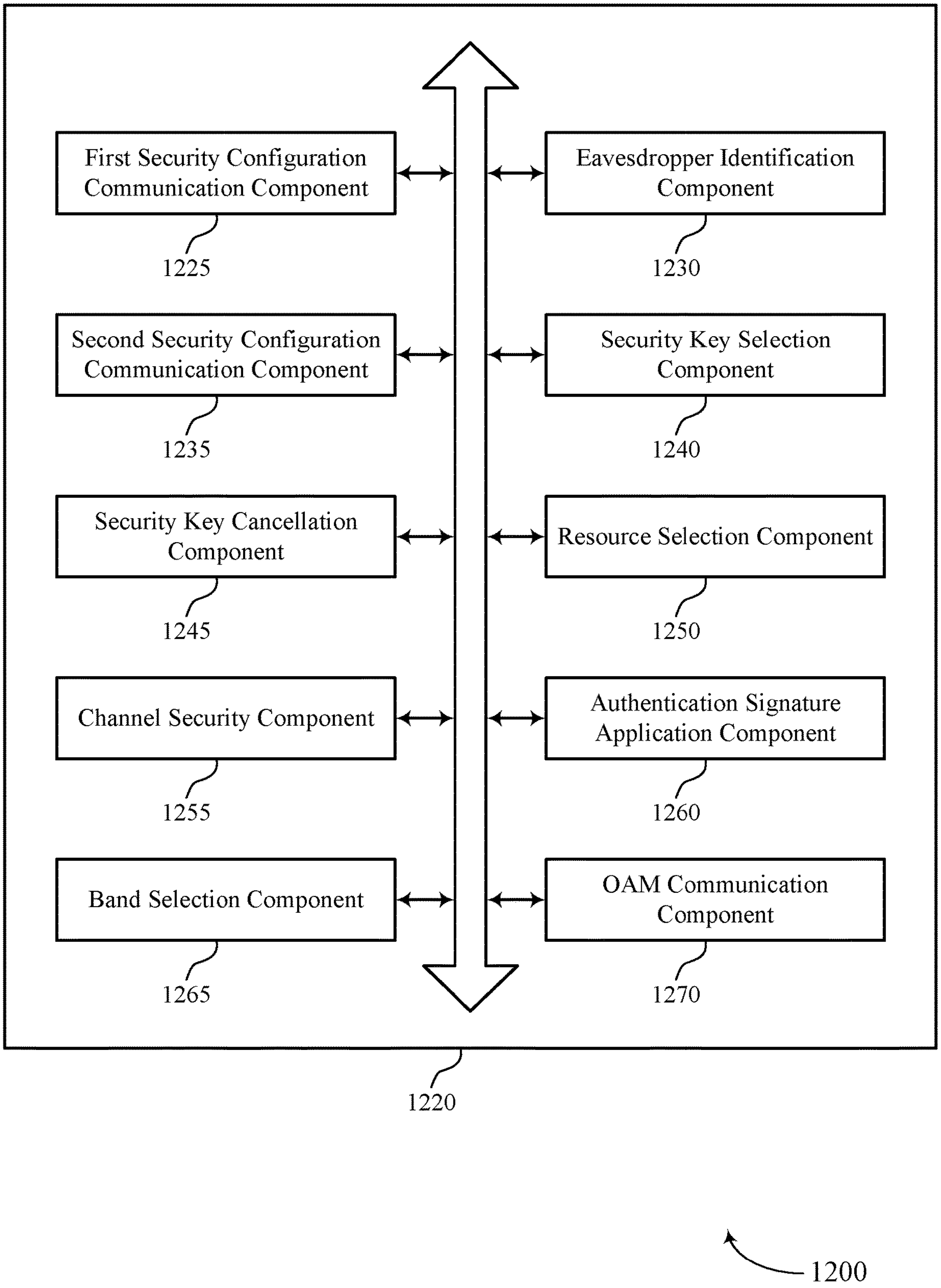
FIG. 12 shows a block diagram of a communications manager that supports eavesdropping detection and methods to mitigate eavesdropping in accordance with one or more aspects of the present disclosure.

FIG. 12 shows a block diagram 1200 of a communications manager 1220 that supports eavesdropping detection and methods to mitigate eavesdropping in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of eavesdropping detection and methods to mitigate eavesdropping as described herein. For example, the communications manager 1220 may include a first security configuration communication component 1225, an eavesdropper identification component 1230, a second security configuration communication component 1235, a security key selection component 1240, a security key cancellation component 1245, a resource selection component 1250, a channel security component 1255, an authentication signature application component 1260, a band selection component 1265, an OAM communication component 1270, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a network entity in accordance with examples as disclosed herein. The first security configuration communication component 1225 may be configured as or otherwise support a means for communicating with a UE using a first security key of a first security configuration for encrypting first messages to communicate between the network entity and the UE. The eavesdropper identification component 1230 may be configured as or otherwise support a means for transmitting, to the UE, a control message that indicates that a wireless device has been detected attempting to intercept the encrypted first messages communicated between the network entity and the UE. The second security configuration communication component 1235 may be configured as or otherwise support a means for communicating, with the UE, second messages encrypted using a second security key of a second security configuration based on switching from the first security configuration to the second security configuration responsive to transmitting the control message indicating that the wireless device has been detected, the second security key associated with a greater security strength than the first security key.

In some examples, the security key selection component 1240 may be configured as or otherwise support a means for selecting the second security key from a set of multiple security keys according to the second security configuration, different security keys of the set of multiple security keys corresponding to different security strengths, different security types, or both.

In some examples, to support transmitting the control message, the security key cancellation component 1245 may be configured as or otherwise support a means for transmitting the control message that cancels the use of a first security key of the first security configuration.

In some examples, the resource selection component 1250 may be configured as or otherwise support a means for switching, based on the transmitted control message, from communicating the encrypted first messages using a first set of resources associated with the first security configuration to communicating the encrypted second messages using a second set of resources associated with the second security configuration, where the second set of resources have a greater security strength than the first set of resources.

In some examples, the first set of resources include one or more of a first set of frequency resources, time resources, beams, antenna ports, transmission modes, or any combination thereof. In some examples, the second set of resources include a corresponding one or more of a second set of frequency resources, time resources, beams, antenna ports, transmission modes, or any combination thereof, different from the first set of resources.

In some examples, the channel security component 1255 may be configured as or otherwise support a means for communicating the encrypted first messages using a first set of channels. In some examples, the channel security component 1255 may be configured as or otherwise support a means for securing the first set of channels based on the wireless device having been detected attempting to intercept the encrypted first messages. In some examples, the channel security component 1255 may be configured as or otherwise support a means for communicating the encrypted second messages using the secured first set of channels.

In some examples, the control message indicates the second security configuration that is associated with increased PHY security, MAC layer security, user plane security, control plane security, or any combination thereof.

In some examples, the authentication signature application component 1260 may be configured as or otherwise support a means for switching, based on the transmitted control message, from communicating the first messages encrypted using a first authentication signature associated with the first security configuration to communicating second messages encrypted using a second authentication signature associated with the second security configuration, where the second authentication signature is associated with a hashing function indicated by the transmitted control message and is associated with a greater security strength than the first authentication signature.

In some examples, the second security configuration communication component 1235 may be configured as or otherwise support a means for communicating, based on the transmitted control message, the encrypted second messages using the second security configuration, where the second security configuration indicates an addition of a noise signal to the encrypted second messages.

In some examples, the band selection component 1265 may be configured as or otherwise support a means for switching, based on the transmitted control message, from communicating the encrypted first messages on a first band in accordance with the first security configuration to communicating a first subset of the encrypted second messages in a second band and a second subset of the encrypted second messages in a third band in accordance with the second security configuration, where the second band and the third band are different from the first band and are associated with a higher security strength than the first band.

In some examples, the second security configuration communication component 1235 may be configured as or otherwise support a means for refraining from communicating at least a portion of the encrypted first messages based on the transmitted control message.

In some examples, the OAM communication component 1270 may be configured as or otherwise support a means for identifying a change in one or more polarization modes associated with communications of the encrypted first messages, the change indicative of the wireless device attempting to intercept the encrypted first messages. In some examples, the OAM communication component 1270 may be configured as or otherwise support a means for communicating the encrypted second messages using the second security configuration based on the change in the one or more polarization modes.

In some examples, the control message includes a downlink control information message encoded with a radio network temporary identifier, transmitted on a control resource set, or both, indicative of the wireless device attempting to intercept the encrypted first messages.

Figure 13:
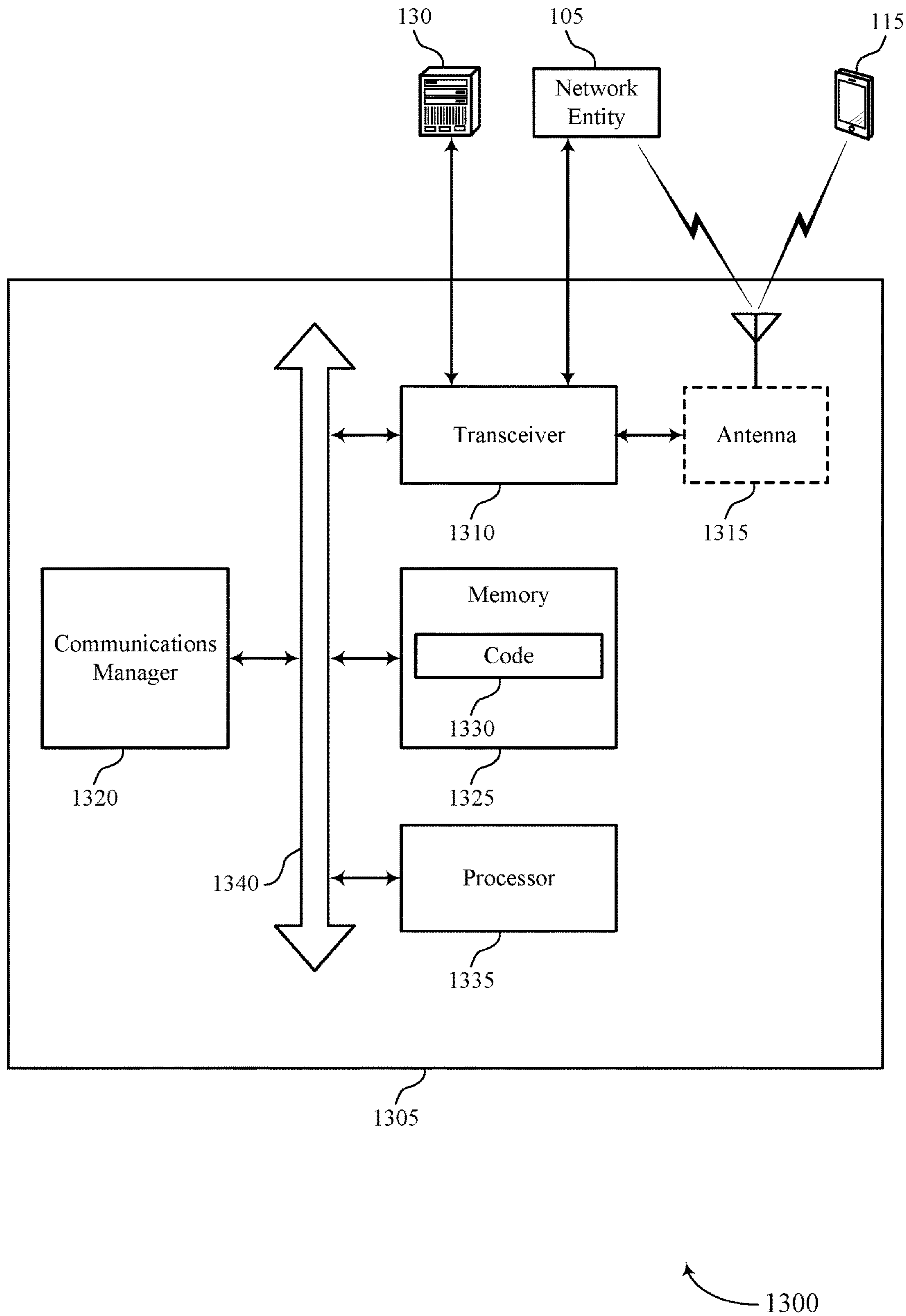
FIG. 13 shows a diagram of a system including a device that supports eavesdropping detection and methods to mitigate eavesdropping in accordance with one or more aspects of the present disclosure.

FIG. 13 shows a diagram of a system 1300 including a device 1305 that supports eavesdropping detection and methods to mitigate eavesdropping in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting eavesdropping detection and methods to mitigate eavesdropping). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a network entity in accordance with examples as disclosed herein. For example, the communications manager 1320 may be configured as or otherwise support a means for communicating with a UE using a first security key of a first security configuration for encrypting first messages to communicate between the network entity and the UE. The communications manager 1320 may be configured as or otherwise support a means for transmitting, to the UE, a control message that indicates that a wireless device has been detected attempting to intercept the encrypted first messages communicated between the network entity and the UE. The communications manager 1320 may be configured as or otherwise support a means for communicating, with the UE, second messages encrypted using a second security key of a second security configuration based on switching from the first security configuration to the second security configuration responsive to transmitting the control message indicating that the wireless device has been detected, the second security key associated with a greater security strength than the first security key.

By including or configuring the communications manager 1320 in accordance with examples as described herein, the device 1305 may support techniques for improved communication reliability, improved coordination between devices, increased data security, improved interference mitigation from eavesdropping devices, dynamic security configuration updating, and increased utilization of communications resources.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of eavesdropping detection and methods to mitigate eavesdropping as described herein, or the processor 1335 and the memory 1325 may be otherwise configured to perform or support such operations.

Figure 14:
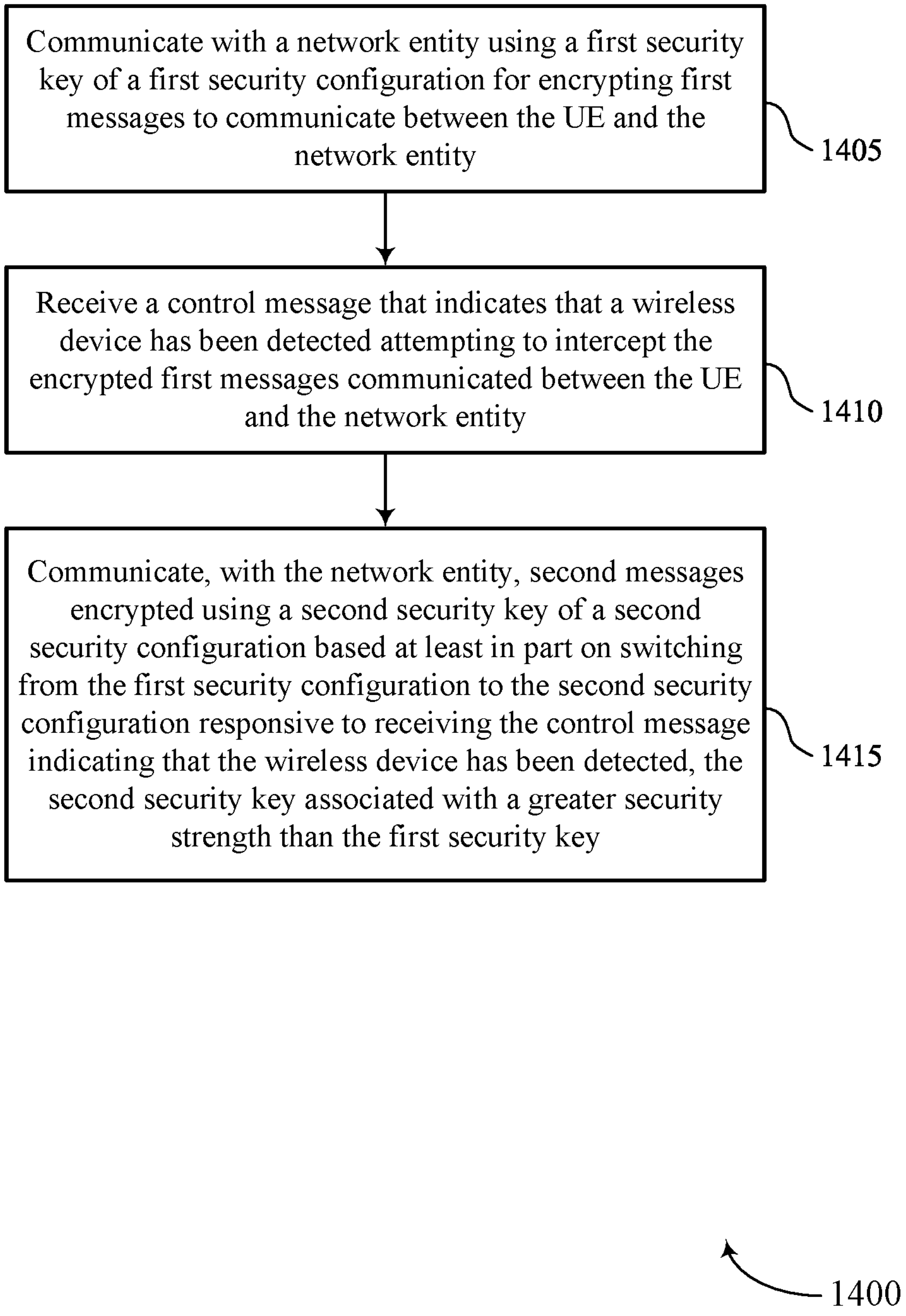
FIGS. 14 through 20 show flowcharts illustrating methods that support eavesdropping detection and methods to mitigate eavesdropping in accordance with one or more aspects of the present disclosure.

FIG. 14 shows a flowchart illustrating a method 1400 that supports eavesdropping detection and methods to mitigate eavesdropping in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include communicating with a network entity using a first security key of a first security configuration for encrypting first messages to communicate between the UE and the network entity. The operations of 1405 may be performed in accordance with examples as disclosed herein. In some examples, aspects of the operations of 1405 may be performed by a first security configuration communication component 825 as described with reference to FIG. 8.

At 1410, the method may include receiving a control message that indicates that a wireless device has been detected attempting to intercept the encrypted first messages communicated between the UE and the network entity. The operations of 1410 may be performed in accordance with examples as disclosed herein. In some examples, aspects of the operations of 1410 may be performed by an eavesdropping identification component 830 as described with reference to FIG. 8.

At 1415, the method may include communicating, with the network entity, second messages encrypted using a second security key of a second security configuration based on switching from the first security configuration to the second security configuration responsive to receiving the control message indicating that the wireless device has been detected, the second security key associated with a greater security strength than the first security key. The operations of 1415 may be performed in accordance with examples as disclosed herein. In some examples, aspects of the operations of 1415 may be performed by a second security configuration communication component 835 as described with reference to FIG. 8.

Figure 15:
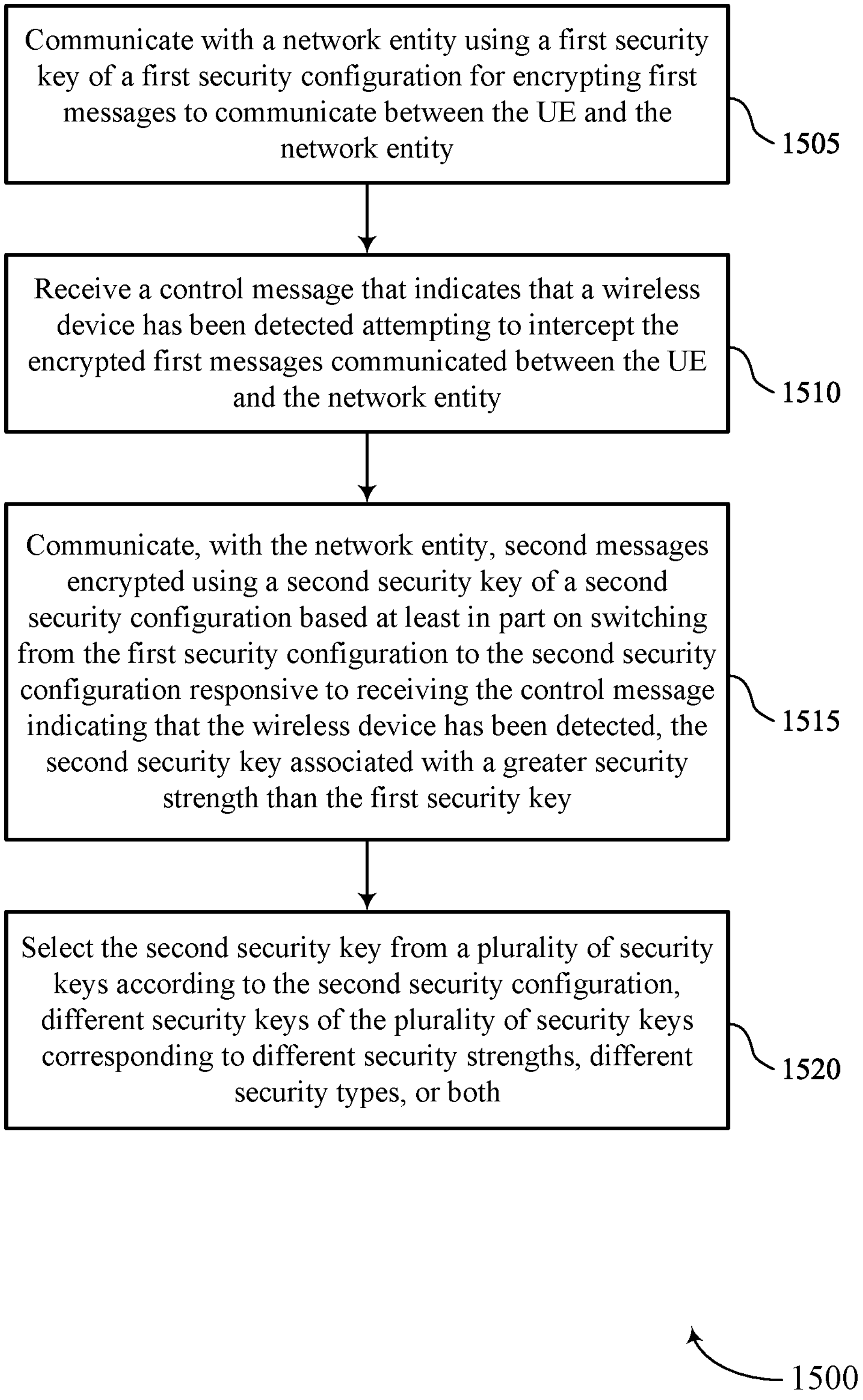

FIG. 15 shows a flowchart illustrating a method 1500 that supports eavesdropping detection and methods to mitigate eavesdropping in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include communicating with a network entity using a first security key of a first security configuration for encrypting first messages to communicate between the UE and the network entity. The operations of 1505 may be performed in accordance with examples as disclosed herein. In some examples, aspects of the operations of 1505 may be performed by a first security configuration communication component 825 as described with reference to FIG. 8.

At 1510, the method may include receiving a control message that indicates that a wireless device has been detected attempting to intercept the encrypted first messages communicated between the UE and the network entity. The operations of 1510 may be performed in accordance with examples as disclosed herein. In some examples, aspects of the operations of 1510 may be performed by an eavesdropping identification component 830 as described with reference to FIG. 8.

At 1515, the method may include communicating, with the network entity, second messages encrypted using a second security key of a second security configuration based on switching from the first security configuration to the second security configuration responsive to receiving the control message indicating that the wireless device has been detected, the second security key associated with a greater security strength than the first security key. The operations of 1515 may be performed in accordance with examples as disclosed herein. In some examples, aspects of the operations of 1515 may be performed by a second security configuration communication component 835 as described with reference to FIG. 8.

At 1520, the method may include selecting the second security key from a set of multiple security keys according to the second security configuration, different security keys of the set of multiple security keys corresponding to different security strengths, different security types, or both. The operations of 1520 may be performed in accordance with examples as disclosed herein. In some examples, aspects of the operations of 1520 may be performed by a security key selection component 840 as described with reference to FIG. 8.

Figure 16:
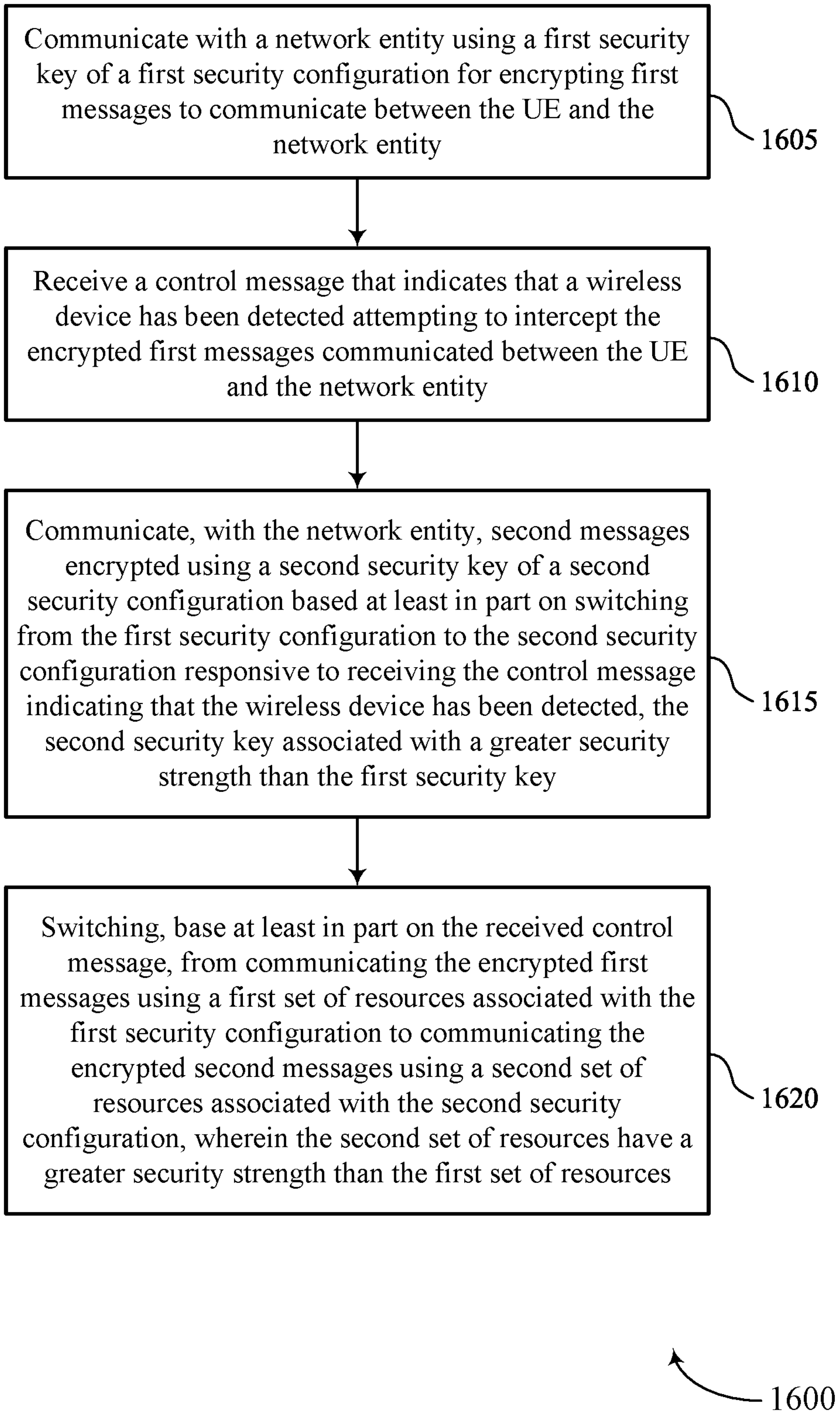

FIG. 16 shows a flowchart illustrating a method 1600 that supports eavesdropping detection and methods to mitigate eavesdropping in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include communicating with a network entity using a first security key of a first security configuration for encrypting first messages to communicate between the UE and the network entity. The operations of 1605 may be performed in accordance with examples as disclosed herein. In some examples, aspects of the operations of 1605 may be performed by a first security configuration communication component 825 as described with reference to FIG. 8.

At 1610, the method may include receiving a control message that indicates that a wireless device has been detected attempting to intercept the encrypted first messages communicated between the UE and the network entity. The operations of 1610 may be performed in accordance with examples as disclosed herein. In some examples, aspects of the operations of 1610 may be performed by an eavesdropping identification component 830 as described with reference to FIG. 8.

At 1615, the method may include communicating, with the network entity, second messages encrypted using a second security key of a second security configuration based on switching from the first security configuration to the second security configuration responsive to receiving the control message indicating that the wireless device has been detected, the second security key associated with a greater security strength than the first security key. The operations of 1615 may be performed in accordance with examples as disclosed herein. In some examples, aspects of the operations of 1615 may be performed by a second security configuration communication component 835 as described with reference to FIG. 8.

At 1620, the method may include switching, based on the received control message, from communicating the encrypted first messages using a first set of resources associated with the first security configuration to communicating the encrypted second messages using a second set of resources associated with the second security configuration, where the second set of resources have a greater security strength than the first set of resources. The operations of 1620 may be performed in accordance with examples as disclosed herein. In some examples, aspects of the operations of 1620 may be performed by a resource selection component 850 as described with reference to FIG. 8.

Figure 17:
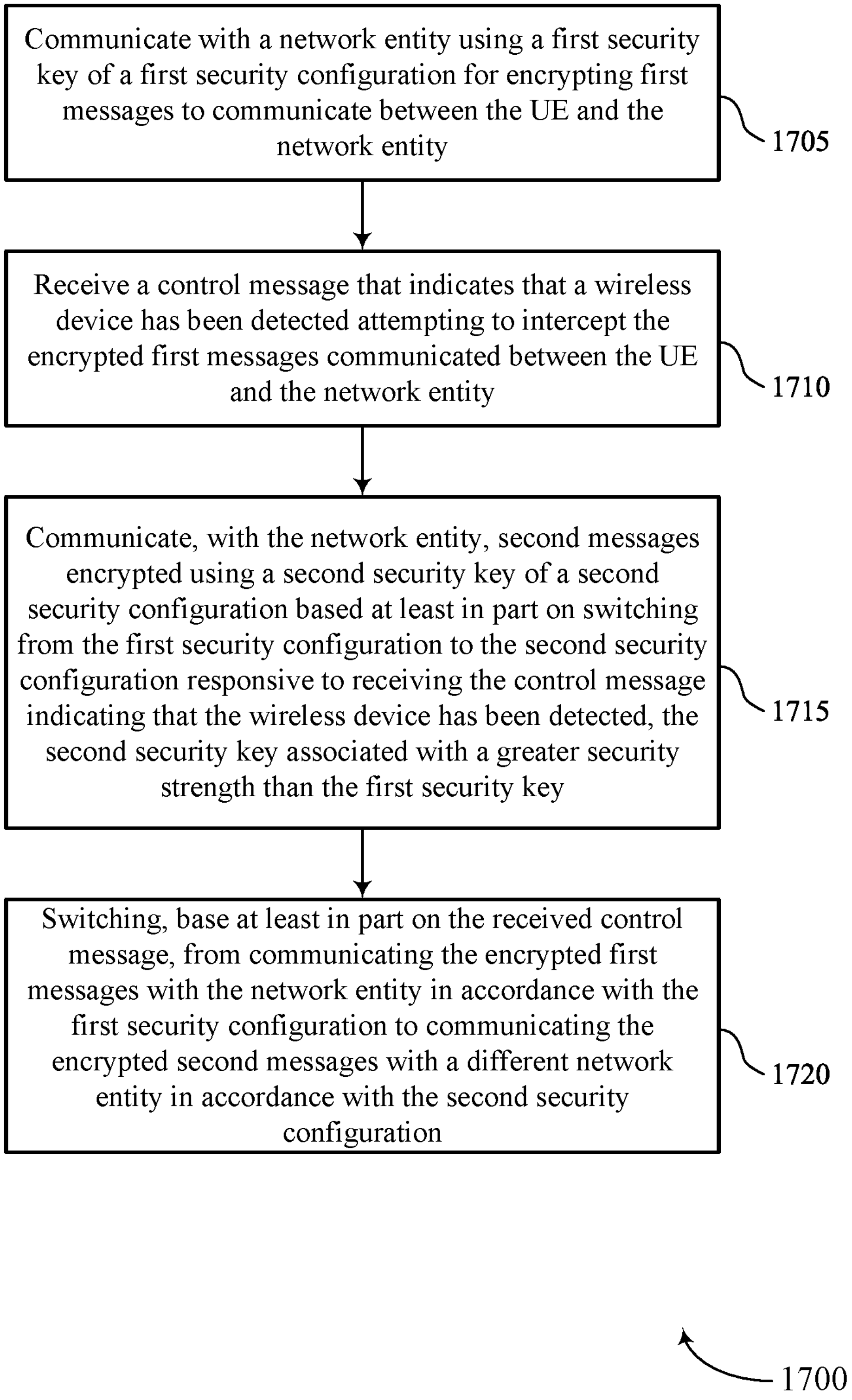

FIG. 17 shows a flowchart illustrating a method 1700 that supports eavesdropping detection and methods to mitigate eavesdropping in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include communicating with a network entity using a first security key of a first security configuration for encrypting first messages to communicate between the UE and the network entity. The operations of 1705 may be performed in accordance with examples as disclosed herein. In some examples, aspects of the operations of 1705 may be performed by a first security configuration communication component 825 as described with reference to FIG. 8.

At 1710, the method may include receiving a control message that indicates that a wireless device has been detected attempting to intercept the encrypted first messages communicated between the UE and the network entity. The operations of 1710 may be performed in accordance with examples as disclosed herein. In some examples, aspects of the operations of 1710 may be performed by an eavesdropping identification component 830 as described with reference to FIG. 8.

At 1715, the method may include communicating, with the network entity, second messages encrypted using a second security key of a second security configuration based on switching from the first security configuration to the second security configuration responsive to receiving the control message indicating that the wireless device has been detected, the second security key associated with a greater security strength than the first security key. The operations of 1715 may be performed in accordance with examples as disclosed herein. In some examples, aspects of the operations of 1715 may be performed by a second security configuration communication component 835 as described with reference to FIG. 8.

At 1720, the method may include switching, based on the received control message, from communicating the encrypted first messages with the network entity in accordance with the first security configuration to communicating the encrypted second messages with a different network entity in accordance with the second security configuration. The operations of 1720 may be performed in accordance with examples as disclosed herein. In some examples, aspects of the operations of 1720 may be performed by a second security configuration communication component 835 as described with reference to FIG. 8.

Figure 18:
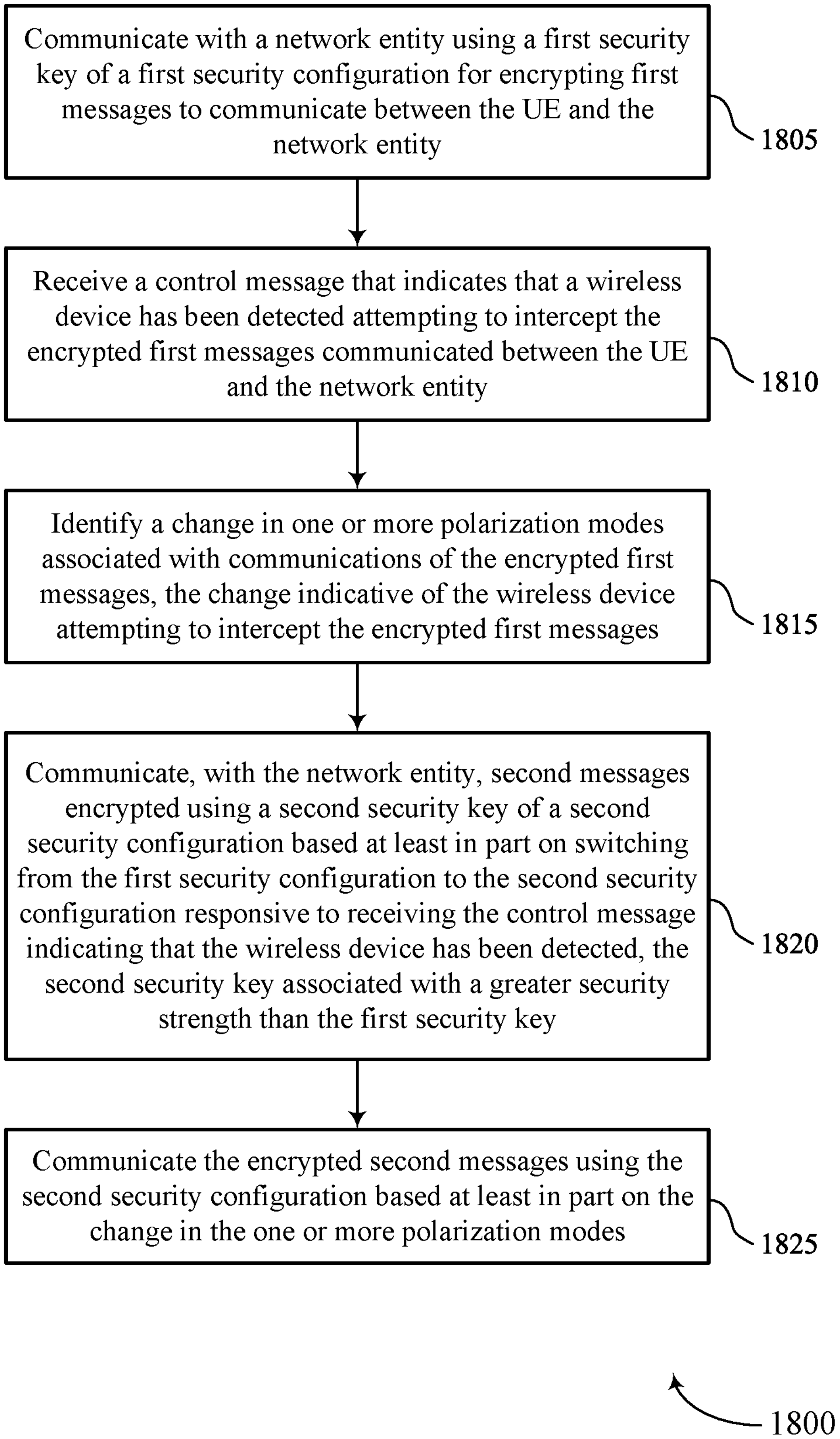

FIG. 18 shows a flowchart illustrating a method 1800 that supports eavesdropping detection and methods to mitigate eavesdropping in accordance with one or more aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1805, the method may include communicating with a network entity using a first security key of a first security configuration for encrypting first messages to communicate between the UE and the network entity. The operations of 1805 may be performed in accordance with examples as disclosed herein. In some examples, aspects of the operations of 1805 may be performed by a first security configuration communication component 825 as described with reference to FIG. 8.

At 1810, the method may include receiving a control message that indicates that a wireless device has been detected attempting to intercept the encrypted first messages communicated between the UE and the network entity. The operations of 1810 may be performed in accordance with examples as disclosed herein. In some examples, aspects of the operations of 1810 may be performed by an eavesdropping identification component 830 as described with reference to FIG. 8.

At 1815, the method may include identifying a change in one or more polarization modes associated with communications of the encrypted first messages, the change indicative of the wireless device attempting to intercept the encrypted first messages. The operations of 1815 may be performed in accordance with examples as disclosed herein. In some examples, aspects of the operations of 1815 may be performed by an OAM communication component 865 as described with reference to FIG. 8.

At 1820, the method may include communicating, with the network entity, second messages encrypted using a second security key of a second security configuration based on switching from the first security configuration to the second security configuration responsive to receiving the control message indicating that the wireless device has been detected, the second security key associated with a greater security strength than the first security key. The operations of 1820 may be performed in accordance with examples as disclosed herein. In some examples, aspects of the operations of 1820 may be performed by a second security configuration communication component 835 as described with reference to FIG. 8.

At 1825, the method may include communicating the encrypted second messages using the second security configuration based on the change in the one or more polarization modes. The operations of 1825 may be performed in accordance with examples as disclosed herein. In some examples, aspects of the operations of 1825 may be performed by an OAM communication component 865 as described with reference to FIG. 8.

Figure 19:
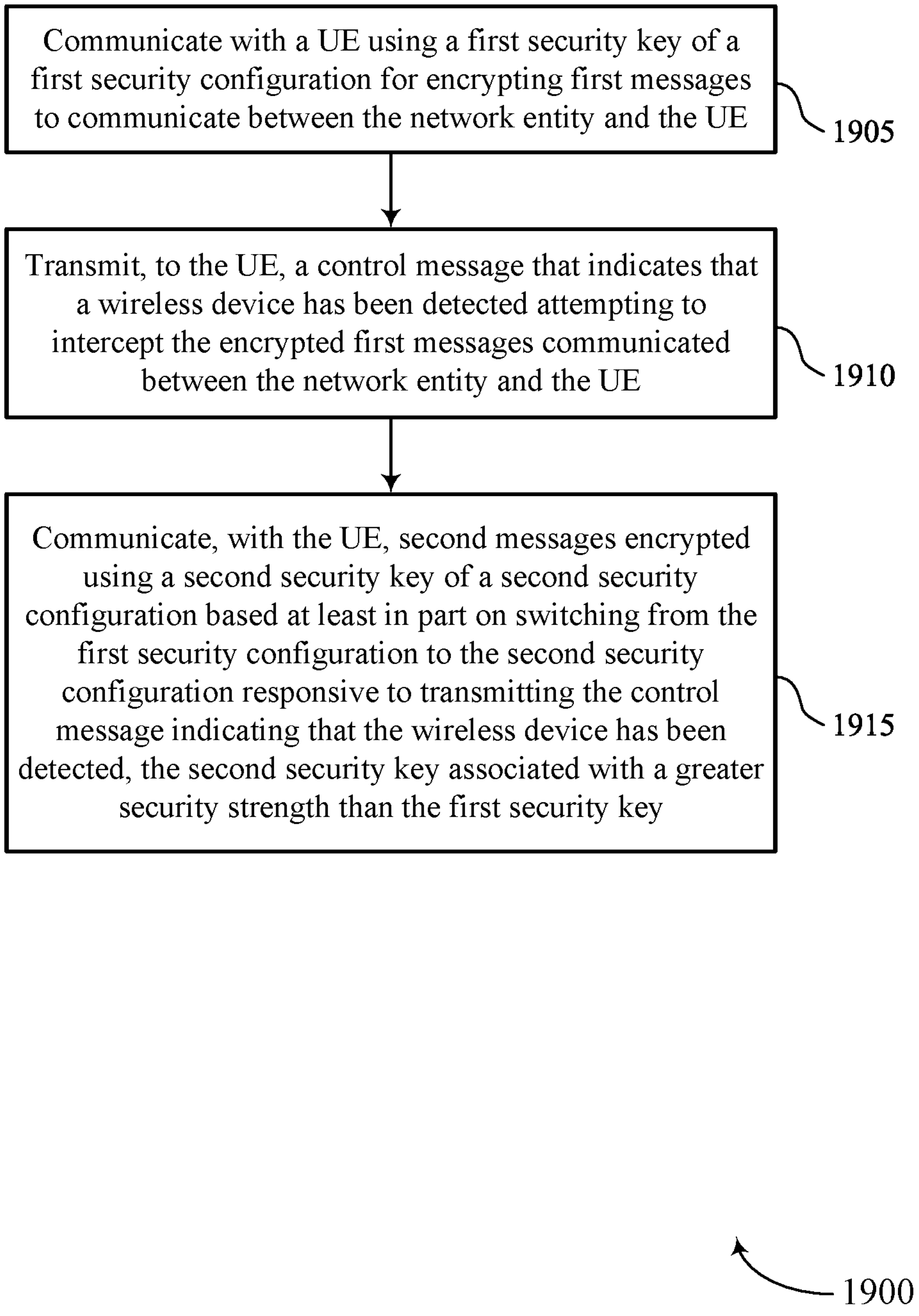

FIG. 19 shows a flowchart illustrating a method 1900 that supports eavesdropping detection and methods to mitigate eavesdropping in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include communicating with a UE using a first security key of a first security configuration for encrypting first messages to communicate between the network entity and the UE. The operations of 1905 may be performed in accordance with examples as disclosed herein. In some examples, aspects of the operations of 1905 may be performed by a first security configuration communication component 1225 as described with reference to FIG. 12.

At 1910, the method may include transmitting, to the UE, a control message that indicates that a wireless device has been detected attempting to intercept the encrypted first messages communicated between the network entity and the UE. The operations of 1910 may be performed in accordance with examples as disclosed herein. In some examples, aspects of the operations of 1910 may be performed by an eavesdropper identification component 1230 as described with reference to FIG. 12.

At 1915, the method may include communicating, with the UE, second messages encrypted using a second security key of a second security configuration based on switching from the first security configuration to the second security configuration responsive to transmitting the control message indicating that the wireless device has been detected, the second security key associated with a greater security strength than the first security key. The operations of 1915 may be performed in accordance with examples as disclosed herein. In some examples, aspects of the operations of 1915 may be performed by a second security configuration communication component 1235 as described with reference to FIG. 12.

Figure 20:
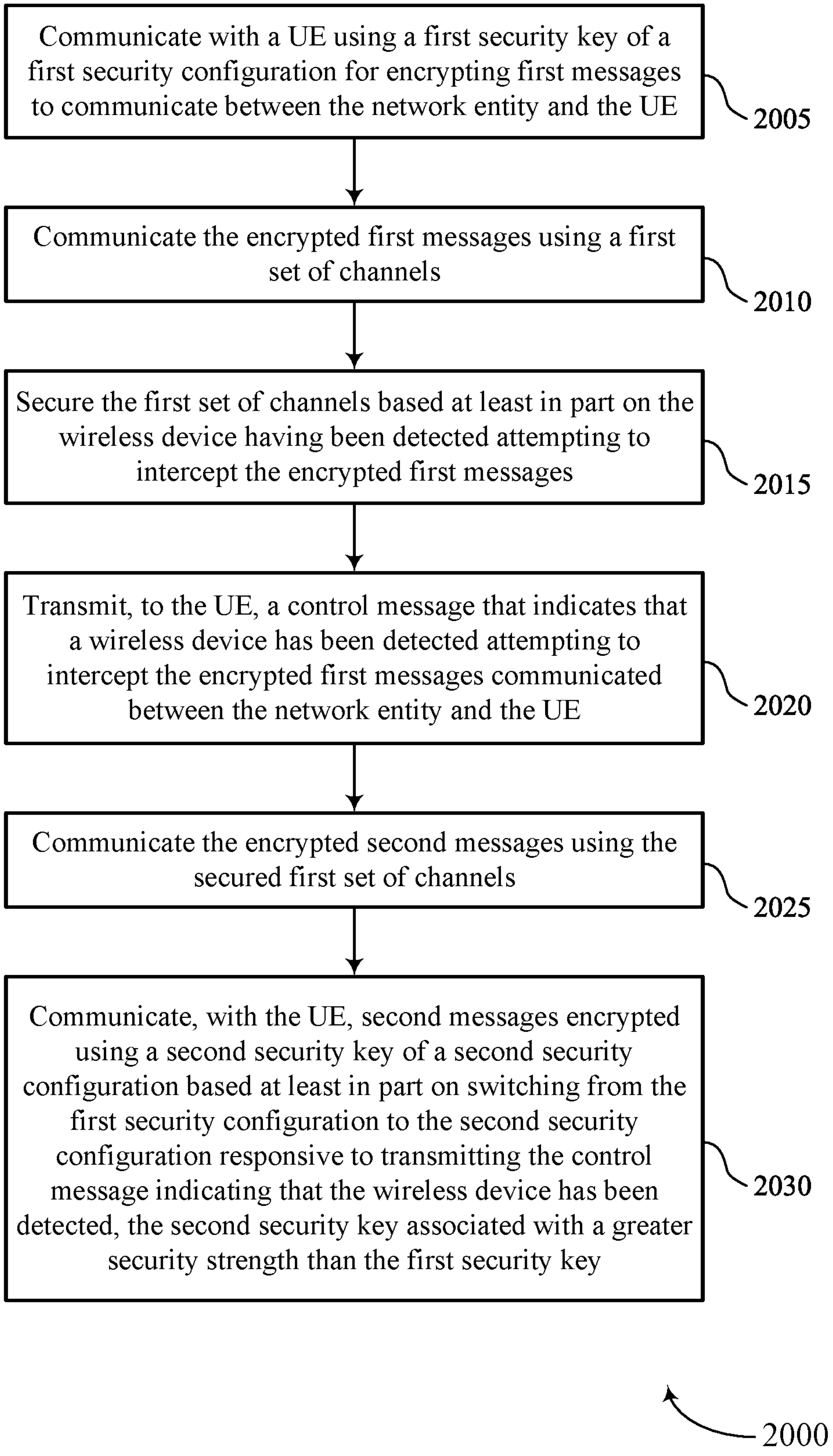

FIG. 20 shows a flowchart illustrating a method 2000 that supports eavesdropping detection and methods to mitigate eavesdropping in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include communicating with a UE using a first security key of a first security configuration for encrypting first messages to communicate between the network entity and the UE. The operations of 2005 may be performed in accordance with examples as disclosed herein. In some examples, aspects of the operations of 2005 may be performed by a first security configuration communication component 1225 as described with reference to FIG. 12.

At 2010, the method may include communicating the encrypted first messages using a first set of channels. The operations of 2010 may be performed in accordance with examples as disclosed herein. In some examples, aspects of the operations of 2010 may be performed by a channel security component 1255 as described with reference to FIG. 12.

At 2015, the method may include securing the first set of channels based on the wireless device having been detected attempting to intercept the encrypted first messages. The operations of 2015 may be performed in accordance with examples as disclosed herein. In some examples, aspects of the operations of 2015 may be performed by a channel security component 1255 as described with reference to FIG. 12.

At 2020, the method may include transmitting, to the UE, a control message that indicates that a wireless device has been detected attempting to intercept the encrypted first messages communicated between the network entity and the UE. The operations of 2020 may be performed in accordance with examples as disclosed herein. In some examples, aspects of the operations of 2020 may be performed by an eavesdropper identification component 1230 as described with reference to FIG. 12.

At 2025, the method may include communicating the encrypted second messages using the secured first set of channels. The operations of 2025 may be performed in accordance with examples as disclosed herein. In some examples, aspects of the operations of 2025 may be performed by a channel security component 1255 as described with reference to FIG. 12.

At 2030, the method may include communicating, with the UE, second messages encrypted using a second security key of a second security configuration based on switching from the first security configuration to the second security configuration responsive to transmitting the control message indicating that the wireless device has been detected, the second security key associated with a greater security strength than the first security key. The operations of 2030 may be performed in accordance with examples as disclosed herein. In some examples, aspects of the operations of 2030 may be performed by a second security configuration communication component 1235 as described with reference to FIG. 12.

The following provides an overview of aspects of the present disclosure:

Aspect 1: A method for wireless communication at a UE, comprising: communicating with a network entity using a first security key of a first security configuration for encrypting first messages to communicate between the UE and the network entity; receiving a control message that indicates that a wireless device has been detected attempting to intercept the encrypted first messages communicated between the UE and the network entity; and communicating, with the network entity, second messages encrypted using a second security key of a second security configuration based at least in part on switching from the first security configuration to the second security configuration responsive to receiving the control message indicating that the wireless device has been detected, the second security key associated with a greater security strength than the first security key.

Aspect 2: The method of aspect 1, further comprising: selecting the second security key from a plurality of security keys according to the second security configuration, different security keys of the plurality of security keys corresponding to different security strengths, different security types, or both.

Aspect 3: The method of any of aspects 1 through 2, wherein receiving the control message comprises: receiving the control message indicating for the UE to cancel the use of the first security key of the first security configuration.

Aspect 4: The method of any of aspects 1 through 3, further comprising: switching, based at least in part on the received control message, from communicating the encrypted first messages using a first set of resources associated with the first security configuration to communicating the encrypted second messages using a second set of resources associated with the second security configuration, wherein the second set of resources have a greater security strength than the first set of resources.

Aspect 5: The method of aspect 4, wherein the first set of resources comprise one or more of a first set of frequency resources, time resources, beams, antenna ports, transmission modes, or any combination thereof; and the second set of resources comprise a corresponding one or more of a second set of frequency resources, time resources, beams, antenna ports, transmission modes, or any combination thereof, different from the first set of resources.

Aspect 6: The method of any of aspects 1 through 5, wherein the control message indicates the second security configuration that is associated with increased PHY security, MAC layer security, user plane security, control plane security, or any combination thereof.

Aspect 7: The method of any of aspects 1 through 6, further comprising: switching, based at least in part on the received control message, from communicating the first messages encrypted using a first authentication signature associated with the first security configuration to communicating the second messages encrypted using a second authentication signature associated with the second security configuration, wherein the second authentication signature is associated with a hashing function indicated by the received control message, and is associated with a greater security strength than the first authentication signature.

Aspect 8: The method of any of aspects 1 through 7, further comprising: communicating, based at least in part on the received control message, the encrypted second messages using the second security configuration, wherein the second security configuration indicates an addition of a noise signal to the encrypted second messages.

Aspect 9: The method of any of aspects 1 through 8, further comprising: switching, based at least in part on the received control message, from communicating the encrypted first messages with the network entity in accordance with the first security configuration to communicating the encrypted second messages with a different network entity in accordance with the second security configuration.

Aspect 10: The method of any of aspects 1 through 9, further comprising: switching, based at least in part on the received control message, from communicating the encrypted first messages on a first band in accordance with the first security configuration to communicating a first subset of the encrypted second messages in a second band and a second subset of the encrypted second messages in a third band in accordance with the second security configuration, wherein the second band and the third band are different from the first band and are associated with a higher security strength than the first band.

Aspect 11: The method of any of aspects 1 through 10, further comprising: refraining from communicating at least a portion of the encrypted first messages based at least in part on the received control message.

Aspect 12: The method of any of aspects 1 through 11, further comprising: identifying a change in one or more polarization modes associated with communications of the encrypted first messages, the change indicative of the wireless device attempting to intercept the encrypted first messages; and communicating the encrypted second messages using the second security configuration based at least in part on the change in the one or more polarization modes.

Aspect 13: The method of any of aspects 1 through 12, wherein the control message comprises a downlink control information message encoded with a radio network temporary identifier, transmitted on a control resource set, or both, indicative of the wireless device attempting to intercept the encrypted first messages.

Aspect 14: A method for wireless communication at a network entity, comprising: communicating with a UE using a first security key of a first security configuration for encrypting first messages to communicate between the network entity and the UE; transmitting, to the UE, a control message that indicates that a wireless device has been detected attempting to intercept the encrypted first messages communicated between the network entity and the UE; and communicating, with the UE, second messages encrypted using a second security key of a second security configuration based at least in part on switching from the first security configuration to the second security configuration responsive to transmitting the control message indicating that the wireless device has been detected, the second security key associated with a greater security strength than the first security key.

Aspect 15: The method of aspect 14, further comprising: selecting the second security key from a plurality of security keys according to the second security configuration, different security keys of the plurality of security keys corresponding to different security strengths, different security types, or both.

Aspect 16: The method of any of aspects 14 through 15, wherein transmitting the control message comprises: transmitting the control message that cancels the use of a first security key of the first security configuration.

Aspect 17: The method of any of aspects 14 through 16, further comprising: switching, based at least in part on the transmitted control message, from communicating the encrypted first messages using a first set of resources associated with the first security configuration to communicating the encrypted second messages using a second set of resources associated with the second security configuration, wherein the second set of resources have a greater security strength than the first set of resources.

Aspect 18: The method of aspect 17, wherein the first set of resources comprise one or more of a first set of frequency resources, time resources, beams, antenna ports, transmission modes, or any combination thereof; and the second set of resources comprise a corresponding one or more of a second set of frequency resources, time resources, beams, antenna ports, transmission modes, or any combination thereof, different from the first set of resources.

Aspect 19: The method of any of aspects 14 through 18, further comprising: communicating the encrypted first messages using a first set of channels; securing the first set of channels based at least in part on the wireless device having been detected attempting to intercept the encrypted first messages; and communicating the encrypted second messages using the secured first set of channels.

Aspect 20: The method of any of aspects 14 through 19, wherein the control message indicates the second security configuration that is associated with increased physical layer security, MAC layer security, user plane security, control plane security, or any combination thereof.

Aspect 21: The method of any of aspects 14 through 20, further comprising: switching, based at least in part on the transmitted control message, from communicating the first messages encrypted using a first authentication signature associated with the first security configuration to communicating second messages encrypted using a second authentication signature associated with the second security configuration, wherein the second authentication signature is associated with a hashing function indicated by the transmitted control message and is associated with a greater security strength than the first authentication signature.

Aspect 22: The method of any of aspects 14 through 21, further comprising: communicating, based at least in part on the transmitted control message, the encrypted second messages using the second security configuration, wherein the second security configuration indicates an addition of a noise signal to the encrypted second messages.

Aspect 23: The method of any of aspects 14 through 22, further comprising: switching, based at least in part on the transmitted control message, from communicating the encrypted first messages on a first band in accordance with the first security configuration to communicating a first subset of the encrypted second messages in a second band and a second subset of the encrypted second messages in a third band in accordance with the second security configuration, wherein the second band and the third band are different from the first band and are associated with a higher security strength than the first band.

Aspect 24: The method of any of aspects 14 through 23, further comprising: refraining from communicating at least a portion of the encrypted first messages based at least in part on the transmitted control message.

Aspect 25: The method of any of aspects 14 through 24, further comprising: identifying a change in one or more polarization modes associated with communications of the encrypted first messages, the change indicative of the wireless device attempting to intercept the encrypted first messages; and communicating the encrypted second messages using the second security configuration based at least in part on the change in the one or more polarization modes.

Aspect 26: The method of any of aspects 14 through 25, wherein the control message comprises a downlink control information message encoded with a radio network temporary identifier, transmitted on a control resource set, or both, indicative of the wireless device attempting to intercept the encrypted first messages.

Aspect 27: An apparatus for wireless communication at a UE, comprising a processor; memory coupled with the processor; and instructions stored in the memory and executable by the processor to cause the apparatus to perform a method of any of aspects 1 through 13.

Aspect 28: An apparatus for wireless communication at a UE, comprising at least one means for performing a method of any of aspects 1 through 13.

Aspect 29: A non-transitory computer-readable medium storing code for wireless communication at a UE, the code comprising instructions executable by a processor to perform a method of any of aspects 1 through 13.

Aspect 30: An apparatus for wireless communication at a network entity, comprising a processor; memory coupled with the processor; and instructions stored in the memory and executable by the processor to cause the apparatus to perform a method of any of aspects 14 through 26.

Aspect 31: An apparatus for wireless communication at a network entity, comprising at least one means for performing a method of any of aspects 14 through 26.

Aspect 32: A non-transitory computer-readable medium storing code for wireless communication at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:

a memory; and a processor coupled to the memory and configured to:

communicate with a network entity using a first security key of a first security configuration for encrypting first messages to communicate between the UE and the network entity;

receive a control message that indicates that a wireless device has been detected attempting to intercept the encrypted first messages communicated between the UE and the network entity; and communicate, with the network entity, second messages encrypted using a second security key of a second security configuration based at least in part on switching from the first security configuration to the second security configuration responsive to receiving the control message indicating that the wireless device has been detected, the second security key associated with a greater security strength than the first security key.

2. The apparatus of claim 1, wherein the processor coupled to the memory is further configured to cause the apparatus to:

select the second security key from a plurality of security keys according to the second security configuration, different security keys of the plurality of security keys corresponding to different security strengths, different security types, or both.

3. The apparatus of claim 1, wherein the processor coupled to the memory is further configured to cause the apparatus to:

receive the control message indicating for the UE to cancel the use of the first security key of the first security configuration.

4. The apparatus of claim 1, wherein the processor coupled to the memory is further configured to cause the apparatus to:

switch, based at least in part on the received control message, from communicating the encrypted first messages using a first set of resources associated with the first security configuration to communicating the encrypted second messages using a second set of resources associated with the second security configuration, wherein the second set of resources have a greater security strength than the first set of resources.

5. The apparatus of claim 4, wherein:

the first set of resources comprise one or more of a first set of frequency resources, time resources, beams, antenna ports, transmission modes, or any combination thereof; and the second set of resources comprise a corresponding one or more of a second set of frequency resources, time resources, beams, antenna ports, transmission modes, or any combination thereof, different from the first set of resources.

6. The apparatus of claim 1, wherein the control message indicates the second security configuration that is associated with increased physical layer security, medium access control layer security, user plane security, control plane security, or any combination thereof.

7. The apparatus of claim 1, wherein the processor coupled to the memory is further configured to cause the apparatus to:

switch, based at least in part on the received control message, from communicating the first messages encrypted using a first authentication signature associated with the first security configuration to communicating the second messages encrypted using a second authentication signature associated with the second security configuration, wherein the second authentication signature is associated with a hashing function indicated by the received control message, and is associated with a greater security strength than the first authentication signature.

8. The apparatus of claim 1, wherein the processor coupled to the memory is further configured to cause the apparatus to:

communicate, based at least in part on the received control message, the encrypted second messages using the second security configuration, wherein the second security configuration indicates an addition of a noise signal to the encrypted second messages.

9. The apparatus of claim 1, wherein the processor coupled to the memory is further configured to cause the apparatus to:

switch, based at least in part on the received control message, from communicating the encrypted first messages with the network entity in accordance with the first security configuration to communicating the encrypted second messages with a different network entity in accordance with the second security configuration.

10. The apparatus of claim 1, wherein the processor coupled to the memory is further configured to cause the apparatus to:

switch, based at least in part on the received control message, from communicating the encrypted first messages on a first band in accordance with the first security configuration to communicating a first subset of the encrypted second messages in a second band and a second subset of the encrypted second messages in a third band in accordance with the second security configuration, wherein the second band and the third band are different from the first band and are associated with a higher security strength than the first band.

11. The apparatus of claim 1, wherein the processor coupled to the memory is further configured to cause the apparatus to:

refrain from communicating at least a portion of the encrypted first messages based at least in part on the received control message.

12. The apparatus of claim 1, wherein the processor coupled to the memory is further configured to cause the apparatus to:

identify a change in one or more polarization modes associated with communications of the encrypted first messages, the change indicative of the wireless device attempting to intercept the encrypted first messages; and communicate the encrypted second messages using the second security configuration based at least in part on the change in the one or more polarization modes.

13. The apparatus of claim 1, wherein the control message comprises a downlink control information message encoded with a radio network temporary identifier, transmitted on a control resource set, or both, indicative of the wireless device attempting to intercept the encrypted first messages.

14. An apparatus for wireless communication at a network entity, comprising:

a memory; and a processor coupled to the memory and configured to:

communicate with a user equipment (UE) using a first security key of a first security configuration for encrypting first messages to communicate between the network entity and the UE;

transmit, to the UE, a control message that indicates that a wireless device has been detected attempting to intercept the encrypted first messages communicated between the network entity and the UE; and communicate, with the UE, second messages encrypted using a second security key of a second security configuration based at least in part on switching from the first security configuration to the second security configuration responsive to transmitting the control message indicating that the wireless device has been detected, the second security key associated with a greater security strength than the first security key.

15. The apparatus of claim 14, wherein the processor coupled to the memory is further configured to cause the apparatus to:

select the second security key from a plurality of security keys according to the second security configuration, different security keys of the plurality of security keys corresponding to different security strengths, different security types, or both.

16. The apparatus of claim 14, wherein the processor coupled to the memory is further configured to cause the apparatus to:

transmit the control message that cancels the use of a first security key of the first security configuration.

17. The apparatus of claim 14, wherein the processor coupled to the memory is further configured to cause the apparatus to:

switch, based at least in part on the transmitted control message, from communicating the encrypted first messages using a first set of resources associated with the first security configuration to communicating the encrypted second messages using a second set of resources associated with the second security configuration, wherein the second set of resources have a greater security strength than the first set of resources.

18. The apparatus of claim 17, wherein:

the first set of resources comprise one or more of a first set of frequency resources, time resources, beams, antenna ports, transmission modes, or any combination thereof; and the second set of resources comprise a corresponding one or more of a second set of frequency resources, time resources, beams, antenna ports, transmission modes, or any combination thereof, different from the first set of resources.

19. The apparatus of claim 14, wherein the processor coupled to the memory is further configured to cause the apparatus to:

communicate the encrypted first messages using a first set of channels;

secure the first set of channels based at least in part on the wireless device having been detected attempting to intercept the encrypted first messages; and communicate the encrypted second messages using the secured first set of channels.

20. The apparatus of claim 14, wherein the control message indicates the second security configuration that is associated with increased physical layer security, medium access control layer security, user plane security, control plane security, or any combination thereof.

21. The apparatus of claim 14, wherein the processor coupled to the memory is further configured to cause the apparatus to:

switch, based at least in part on the transmitted control message, from communicating the first messages encrypted using a first authentication signature associated with the first security configuration to communicating second messages encrypted using a second authentication signature associated with the second security configuration, wherein the second authentication signature is associated with a hashing function indicated by the transmitted control message and is associated with a greater security strength than the first authentication signature.

22. The apparatus of claim 14, wherein the processor coupled to the memory is further configured to cause the apparatus to:

communicate, based at least in part on the transmitted control message, the encrypted second messages using the second security configuration, wherein the second security configuration indicates an addition of a noise signal to the encrypted second messages.

23. The apparatus of claim 14, wherein the processor coupled to the memory is further configured to cause the apparatus to:

switch, based at least in part on the transmitted control message, from communicating the encrypted first messages on a first band in accordance with the first security configuration to communicating a first subset of the encrypted second messages in a second band and a second subset of the encrypted second messages in a third band in accordance with the second security configuration, wherein the second band and the third band are different from the first band and are associated with a higher security strength than the first band.

24. The apparatus of claim 14, wherein the processor coupled to the memory is further configured to cause the apparatus to:

refrain from communicating at least a portion of the encrypted first messages based at least in part on the transmitted control message.

25. The apparatus of claim 14, wherein the processor coupled to the memory is further configured to cause the apparatus to:

identify a change in one or more polarization modes associated with communications of the encrypted first messages, the change indicative of the wireless device attempting to intercept the encrypted first messages; and communicate the encrypted second messages using the second security configuration based at least in part on the change in the one or more polarization modes.

26. The apparatus of claim 14, wherein the control message comprises a downlink control information message encoded with a radio network temporary identifier, transmitted on a control resource set, or both, indicative of the wireless device attempting to intercept the encrypted first messages.

27. A method for wireless communication at a user equipment (UE), comprising:

communicating with a network entity using a first security key of a first security configuration for encrypting first messages to communicate between the UE and the network entity;

receiving a control message that indicates that a wireless device has been detected attempting to intercept the encrypted first messages communicated between the UE and the network entity; and communicating, with the network entity, second messages encrypted using a second security key of a second security configuration based at least in part on switching from the first security configuration to the second security configuration responsive to receiving the control message indicating that the wireless device has been detected, the second security key associated with a greater security strength than the first security key.

28. The method of claim 27, further comprising:

selecting the second security key from a plurality of security keys according to the second security configuration, different security keys of the plurality of security keys corresponding to different security strengths, different security types, or both.

29. The method of claim 27, wherein receiving the control message comprises:

receiving the control message indicating for the UE to cancel the use of the first security key of the first security configuration.

30. A method for wireless communication at a network entity, comprising:

communicating with a user equipment (UE) using a first security key of a first security configuration for encrypting first messages to communicate between the network entity and the UE;

transmitting, to the UE, a control message that indicates that a wireless device has been detected attempting to intercept the encrypted first messages communicated between the network entity and the UE; and communicating, with the UE, second messages encrypted using a second security key of a second security configuration based at least in part on switching from the first security configuration to the second security configuration responsive to transmitting the control message indicating that the wireless device has been detected, the second security key associated with a greater security strength than the first security key.

* * * * *